United States Patent [19]

Harumoto et al.

[11] Patent Number: 4,900,200
[45] Date of Patent: Feb. 13, 1990

[54] METHOD FOR TRANSPORTING POWDERED OR GRANULAR MATERIALS BY PNEUMATIC FORCE WITH A TRANSPORT PIPE OF SMALLER DIAMETER RELATIVE TO PARTICALE SIZE

[75] Inventors: Kimura Harumoto, Hirakata; Tanigawa Toyoaki, Takatsuki, both of Japan

[73] Assignee: Matsui Manufacturing Co., Ltd., Osaka, Japan

[21] Appl. No.: 210,078

[22] Filed: Jun. 22, 1988

[51] Int. Cl.$^4$ ............................................ B65G 53/04
[52] U.S. Cl. ....................................... 406/93; 406/106; 406/108; 406/122; 406/145; 406/151; 406/152; 406/153; 406/191
[58] Field of Search .................... 406/93, 197, 198, 137, 406/90, 94, 95, 106, 108, 122, 141, 143, 145, 151, 152, 153, 175, 168, 191, 193

[56] References Cited
U.S. PATENT DOCUMENTS

| 1,718,507 | 6/1929 | Wenzel et al. | 406/153 |
| 2,661,244 | 12/1953 | Baily | 406/143 |
| 2,920,922 | 1/1960 | Minnick et al. | 406/108 |
| 3,380,780 | 4/1968 | Allen et al. | 406/93 |
| 4,511,291 | 4/1985 | Quates, Sr. et al. | 406/168 |
| 4,685,840 | 8/1987 | Wolff | 406/197 |

Primary Examiner—Joseph F. Peters, Jr.
Assistant Examiner—Anne Sartelle
Attorney, Agent, or Firm—Koda & Androlia

[57] ABSTRACT

An arrangement of pneumatic-transporting a powdered or granular maerials such that they do not lodge, using the transport pipe smaller diameter having the bore 2-6 times as long as maximum length of the particle of the powdered or granular materials to be transported, while the powdered or granular materials are caused to float at the inlet of the transport pipe or in the vicinity of the inlet thereof by the powdered or granular materials floating apparatus with help of the collector provided on the transporting destination at the outlet of the transport pipe.

29 Claims, 35 Drawing Sheets

METHOD FOR TRANSPORTING POWDERED OR GRANULAR MATERIALS BY PNEUMATIC FORCE WITH A TRANSPORT PIPE OF SMALLER DIAMETER RELATIVE TO PARTICALE SIZE

BACKGROUND OF THE INVENTION

1. Field of the Invention

The present invention is used for a pneumatic transporting apparatus for transporting powdered or granular materials, various kinds of raw materials for plastic, medicine, processed foods and the like, from a source from which the materials are supplied, through a transport pipe to a destination, utilizing pneumatic force of transporting gas, such as air, argon, nitrogen gas and the like, which is sucked in or pressurized to be fed, and, more specifically, relates to a method for transporting the powdered or granular materials by the pneumatic force with the transport pipe of smaller diameter used in such a manner that powdered or granular materials do not lodge (are not fixed) in the transport pipe and its apparatus.

2. Prior Art

In this kind of apparatus for transporting the powdered or granular materials by the pneumatic force, it is preferable that the powdered or granular materials, an article to be carried, such as a plastic pellet and the like, can be transported from an original transporting place to a transporting destination such that the powdered or granular materials do not lodge in the transport pipe. In order to attain this requirement, conventionally, various kinds of improvements in each of parts including the original transporting place, the transport pipe, and the transporting destination have been proposed. For example, trial ideas are that the original transporting place has a lower part of a storage vessel equipped with a feeder such as a rotary feeder and the like, compressed air is fed into a multiplicity of small holes being longitudinally made in a air pipe, smaller in diameter by fraction of the transport pipe, which is inserted into the transport pipe, and a cyclone separator is provided on the transporting destination.

Generally, the technical common sense in the industrial circle concerned is that a bore of the transport pipe ought to be adequate enough to prevent an apprehension of clogging the inside of the transport pipe with the powdered or granular materials, the article to be carried, such as a synthetic-resin-made pellet, i.e. it should be over 7 times as long as maximum length of particle of the powdered or granular materials.

As the transport pipe for transporting the ordinary synthetic-resin-made pellet by pneumatic force, conventionally, the transport pipe of larger diameter whose bore is approximately over 25 mm has been used. The fact is that even in the cases of grain whose maximum length of the particle of the powdered or granular materials is smaller than the afore-mentioned length and powder which is smaller than grain, the transport pipe of larger diameter whose bore is approximately over 25 mm is used.

In order to prevent the clogging of the transport pipe with the powdered or granular materials, as mentioned above, the bore of the transport pipe becomes unavoidably larger, as the industrial circle concerned recognized that the transport pipe of smaller diameter is not suitable for a practical application, because clogging of the transport pipe with the powdered or granular materials takes place.

In light of the recent preference for the small lot of plural productions, since a transportation of the powdered or granular materials with the transport pipe of larger diameter is led to an over-enlargement of the bore (sectional area) of the transport pipe in comparison with quantity of the powdered or granular materials to be transported, in addition to a larger space for piping, the piping work becomes complicated so that in terms of the facilities as well as the costs, an uneconomical situation is incurred.

In contrast with that, the transport pipe of smaller diameter overcomes the many shortcomings possessed by the afore-mentioned larger diameter. In this connection, the present inventors, as a result of their repeated research and experiments aimed at a realization of the transportation of the powdered or granular materials through use of the transport pipe of smaller diameter, discovered that even if the bore of the transport pipe, made of the synthetic resin or metal, is 2-6 times as long as maximum length of the particle of the powdered and granular materials, it is possible to transport the powdered and granular materials in such a manner that they do not lodge in the transport pipe. Nevertheless, the following questions are finally left unsolved : Namely, since a sectional area of flowing the powdered or granular materials is markedly narrowed at an inlet of the transport pipe, i.e. in vicinity of an outlet of the storage vessel containing the powdered or granular materials, the original transporting place is clogged with the powdered or granular materials. Further are that the outlet of the transport pipe, i.e. the transporting destination wherein the powdered or granular materials are collected such that they are separated from transporting gas, is also clogged with materials such that a separation efficiency between the transporting gas or dust and the powdered or granular materials is lowered.

As a result of the repeated study and development, by the present inventors, aimed at providing a solution of such subjects, as mentioned in the description hereinbelow, they succeed in developing means of solving the subjects.

In order to transport the powdered or granular materials by the pneumatic force with the afore-mentioned transport pipe of smaller diameter used, if appliances which have been conventionally used at the original transporting place and the transporting destination adopted, they become clogged with the powdered or granular materials, and the appliances are costly, being voluminous so that, after all, the aforementioned arrangement, which is different from the present inventor's pursuable product, cannot avoid an occurrence of clogging with the powdered or granular materials, miniaturize and simplify its construction, and provide the same at low costs.

Namely, as for the original transporting place, as mentioned above, the known idea is that the rotary feeder is provided on the lower part of the storage vessel. The rotary feeder employs a type in which a rotor having several units of blades around its rotational shaft is rotated in a case, and the powdered or granular materials being received among the blades after falling from the storage vessel located at the upper position are quantitatively discharged from an exhaust port located at the lower position. Since such a rotary feeder is required to perform such counter-actions as a transfer of the powdered or granular materials and blocking of the transporting gas at the same time, a critically problematic point lies in a gap between the rotor and the casing. From that view, the afore-mentioned rotary feeder has a structural defect that if the gap becomes smaller, although the air-tightness is improved, an increase in wear of the powdered or granular materials, caused by their engagement with the narrow gap, and a rotational resistance against the motion of the rotor is unavoidable. For this reason, also in the case of connecting this kind of rotary feeder to the transport pipe of smaller diameter, the same defect takes place.

As for the transporting destination, as mentioned above, a trial idea is that the cyclone separator is provided on an exhaust end of the transport pipe. In that case, the defect of cyclone separator which causes free vortex to give centrifugal force to the particle in air current, thereby collecting the powdered or granular materials from the gas in a separated manner, is that the size of particle which can be collected is over several μms and that such a separator is voluminous.

SUMMARY OF THE INVENTION

The primary objective of the present invention is to provide a method for transporting powdered or granular materials by pneumatic force, using a transport pipe of smaller diameter having a bore 2–6 times as long as maximum length of particle of the powdered or granular materials, such that the powdered or granular materials do not lodge in an inlet of transport pipe, where a sectional area of flowing the powdered or granular materials becomes considerably narrow, or in vicinity of the inlet thereof and an apparatus for the same.

For this reason, a further objective of the present invention is to provide the apparatus for transporting the powdered or granular materials by the pneumatic force which makes a piping space of the transporting pipe smaller, simplifies and facilitates the piping work, and is economical in terms of facilities and expenditure.

A still further objective of the present invention is to provide a device located at the original transporting place and a device located at the transporting destination, simple in structure, miniaturized, and less expensive, which does not cause the powdered or granular materials to lodge in the original transporting place located at the inlet of the transport pipe of smaller diameter and the transporting destination located at the outlet thereof.

Other objectives, the characteristics, and the advantageousness of the present invention will be apparent from the following description:

In order to attain the afore-mentioned objective, the present invention is to arrange the powdered or granular materials to be transported through the transport pipe, while they are kept to float in the inlet of the transport pipe or in vicinity of the inlet thereof, using the transport pipe of smaller diameter having the bore 2–6 times as long as maximum length of the particle of the powdered or granular materials. In the present invention, a meaning of "floating" is widely defined to read a motion being made from some part to other part without any stop at a fixed place such as an agitation, a fluidization, a wave motion.

As a specified means of floating the powdered or granular materials, a first option may be that at the same time when an intermittent jet of the gas at the inlet of the transport pipe of smaller diameter or in vicinity of the outlet thereof causes the powdered or granular materials to be moved, an obstruction of flow of the powdered or granular materials, made once at the jet of the gas, adapts them to flow intermittently; a second option may be that the air is continuously supplied or that the intermittent supply and the continuous supply of the gas are employed at the same time; a third option may be that such an actuating unit as a piston rod which is provided in vicinity of the transport pipe of smaller diameter in such a manner that the actuating unit may freely make an advance/retreat in the transport pipe, causes the powdered or granular materials to be moved, or that the afore-mentioned supply of the gas and the action of the actuating unit are employed at the same time, and, after all, the means of floating the powdered or granular materials is optional. The best mode is that the powdered or granular materials flow intermittently into the transport pipe, and an accepted alternative is a continuous flowing of them.

As the pneumatic transporting apparatus for putting the afore-mentioned method in a practical use, the present invention comprises a storage vessel, the transport pipe of smaller diameter, having the bore 2–6 times as long as maximum length of the particle of the powdered or granular materials to be transported, which communicates with a material outlet of the storage vessel, the source of pneumatic force for transporting the powdered or granular materials in the storage vessel through the transport pipe to the destination such as a blower, a compressor, a vacuum pump and the like, and a powdered or granular floating means of transporting the powdered or granular materials by the pneumatic force through the transport pipe to the destination in such a manner that they do not lodge in the transport pipe, while they are caused to be kept to float at the inlet of the transport pipe or in vicinity of the inlet thereof.

If the transport pipe is made of the same raw materials as that for the powdered or granular materials, a resulting advantageousness is that even if an inner wall of the transport pipe by itself is worn and broken by the powdered or granular materials, it does not become foreign matter, being able to be used. The optional scope of raw materials for forming the transport pipe, of course, includes metal, ultra-high-molecular polyethylene, plastic, ceramic and the like.

The powdered or granular materials floating means may employ the following various kinds of constructions:

The first construction is that a feeder having the inlet communicating with the material outlet of the storage vessel, the outlet communicating with the transport pipe, and a passage for transporting the material is formed, a 1st gas conducting hole located at an upper-stream side of the passage for transporting the material and a 2nd gas conducting hole located at a lower-stream side thereof are formed to communicate with the passage for transporting the material such that the compressed gas for transporting the material can be supplied from the 1st conducting hole, whereas the compressed air for transporting smoothly the residual powdered or granular materials in the piping upon completion of transporting the material can be supplied from the 2nd conducting hole. In that case, the best form of the feeder inlet takes an elliptical cross section, and it is of course accepted to take other form.

The second construction is that a lower end part side of the transport pipe is inserted into the storage vessel, the feeder for transporting the powdered or granular materials in the storage vessel to an upper end part side by the pneumatic force is used, a material inlet communicating with a transporting passage of the transport pipe is formed in a side wall of a joint which is connected to the lower part of the transport pipe or the lower end part thereof in such a manner that the joint constitutes partially the transport pipe, and a jet hole of a nozzle, being connected to the source of pneumatic force, which is also connected to the lower side of the material inlet, is opposite to the transport pipe, communicating with the inside of the transport pipe. In that case, it is the best, if the nozzle is provided movably with respect to the material inlet, because such an arrangement enables a mixing quantity of the powdered or granular materials which are sucked in from the material inlet to be adjusted. A further accepted alternative is that the nozzle is fixed, if a length of the transporting distance and physical properties of the powdered or granular materials demand such a fixing.

The third construction is that a rotational plate is provided in vicinity of the inlet of the transport pipe communicating with the material outlet of the storage vessel, and one or a plurality of openings, which communicate with the inlet of the transport pipe, are formed in the rotational plate.

The fourth construction comprises a reciprocating movable article being vertically moved in a reciprocating movable article housing part which is formed between the material outlet of the storage vessel and the inlet of the transport pipe communicating with the material outlet, and a fluid pressure cylinder which drives vertically the reciprocating movable article.

The fifth construction is that a material housing chamber of the feeder being connected to the storage vessel is formed at an eccentric position from a material conducting passage, a material outlet being connected to the transport pipe is formed in the desirable place of the material housing chamber, the nozzle being connected to the source of pneumatic force is provided at the position opposite to the material outlet, and an angle of repose restricting member, such as a rotor and the like, for facing a surface part of the material which is transported, forming the angle of repose, within the scope of the opening sectional area of the material outlet, is provided in vicinity of the material housing chamber.

In that case, an accepted alternative is that the angle of repose restricting member may be a rotor on the outer periphery of which one or a plurality of material housing recessed parts are formed, or a partition plate capable of adjusting an admission depth into the material housing chamber or the material conducting passage so that an optional change in design is possible. The nozzle may be provided detachably and movably with respect to the feeder.

The sixth construction comprises the material housing chamber being formed into a thin-layer-shaped space so that it is filled with the powdered or granular materials in a thin-layer-shaped manner, the feeder proper being connected to the storage vessel, the transport pipe being connected to communicate with one side of the material outlet of the material housing chamber, and the nozzle being connected to communicate with another side thereof such that it is opposed to the transport pipe.

In that case, a preferable mode of the feeders has the inlet of the material housing chamber inclined to the outlet thereof. An adjusting member capable of adjusting a flow of the material is preferably provided in vicinity of material outlet of the material housing chamber of the feeder proper. It is also accepted that the adjusting member is fixed or provided movably in vicinity of the material outlet of the material housing chamber. The further function of the adjusting member includes narrowing of the inner wall of the transport pipe of smaller diameter, while throttling the same.

Furthermore, the apparatus for transporting the powdered or granular materials by the pneumatic force with the transport pipe of smaller diameter used in such a manner that the powdered or granular materials do not lodge in the transport pipe comprises the storage vessel, the transport pipe of smaller diameter, having the bore 2–6 times as long as maximum length of the particle of the powdered or granular materials to be transported, which communicates with the material outlet of the storage vessel, the source of pneumatic force for transporting the powdered or granular materials in the storage vessel through the transport pipe to the destination, the powdered or granular floating means of transporting the powdered or granular materials by the pneumatic force through the transport pipe to the destination in such a manner that the powdered or granular materials do not lodge in the transport pipe, while the powdered or granular materials are kept to float at the inlet of the transport pipe or in vicinity of the inlet thereof, and a collector for collecting the powdered or granular materials and transporting gas in a separated manner which is provided on the outlet end of the transport pipe.

It is accepted that the collector is connected to the outlet end of the transport pipe, a suction port of a vacuum pump acting as the source of pneumatic force is connected to an exhaust port of the collector, a port of supplying the gas for floating the powdered or granular materials, acting as one of powdered or granular floating means, is formed in vicinity of the inlet of the transport pipe, and the exhaust port of the vacuum pump is connected to the port of supplying the gas.

An arrangement is also accepted in which the collector has an electrode located at least partial part of a wall on the housing chamber side of the collector, the electrode, opposite to the former electrode, is provided in the housing chamber in the wall on the housing chamber side, a pair of or a plurality units of electrodes, different from each other and opposite to each other, are formed to be overlaid upon each other in the wall on the housing chamber side with an insulating part interposed between them, and a change in electrostatic capacity between these electrodes, caused by filling with the powdered or granular materials, is detected by a detector being connected to the electrodes, thereby detecting a level of the powdered or granular materials in the housing chamber of the collector.

An arrangement is further accepted in which the collector comprises the collector proper for collecting the powdered or granular materials, and a separator for separating the powdered or granular materials and the transporting gas from each other, the separator is disposed on an upper-stream side with respect to the collector proper, a gas conducting passage for taking out the transporting gas and dust is provided in the transport pipe, and the exhaust hole for discharging the separated gas and dust to the outside of the separator is formed in the outer wall of the separator.

It is accepted that the exhaust hole being formed in the separator, and an alternative optionally lies in forming the outer wall of the separator out of permeable material through which the transporting gas and the dust can pass.

With regard to the bore of the powdered or granular passage of the transport pipe being inserted into the separator, one on the lower-stream is preferably identical or slightly larger than another on the upper-stream.

The gas conducting passage is constituted by a slit made between the lower end margin of the transport pipe being inserted into the separator and the upper opening margin of the material outlet of the separator, and the slit can be formed such that a vertical motion of the transport pipe enables a flow sectional area of the slit to be changed. A notch being formed in the transport pipe acts optionally as the gas conducting passage, and a description of its modified example will be made in the under-mentioned embodiment.

It meets the requirement that, as mentioned above, the collector proper and the separator being disposed on the upper-stream side thereof constitute the collector, the gas conducting passage is provided in the transport pipe being inserted into the separator, and an exhaust hole mounting part is formed in the outer wall of the separator, while the pipe of supplying the gas for cleaning the gas conducting passage is connected to the exhaust pipe which is connected to the exhaust hole mounting hole of the separator.

The inside of the collector is cleaned by the gas from the gas supplying pipe which is provided on the collector proper, and the exhaust gas can be discharged from the exhaust hole being provided in the separator or the collector proper to the outside. In that case, the gas supplying pipe is provided on the upper part and/or the lower part of the collector proper, and an accepted idea is that the gas being supplied from the upper gas supplying pipe to the lower-stream side is adapted to become ascending current so that it is discharged to the exhaust hole, while the gas being supplied from the lower gas supplying pipe to the upper-stream side is discharged to the exhaust hole.

Thus, as the powdered or granular floating means for transporting the powdered or granular materials by the pneumatic force with the transport pipe of smaller diameter used in such a manner the powdered or granular materials do not lodge in the transport pipe, various kinds of arrangements executed at the inlet of the transport pipe or in vicinity of the inlet thereof include the jet of the gas such as the compressed gas, the actuation of the actuating article such as the rotational plate, and the concurrent usage of the jet of the gas such as the compressed gas and the actuating article.

As the collector for transporting the powdered or granular materials by the pneumatic force with the transport pipe of smaller diameter used in such a manner that the powdered or granular materials do not lodge in the transport pipe may employ the afore-mentioned construction.

BRIEF DESCRIPTION OF THE DRAWINGS

FIG. 22 is an outline of system diagram of an example to which FIG. 20 is applied;

FIG. 25 is a partial longitudinal sectional view of an example to which FIG. 24 is applied;

DETAILED DESCRIPTION OF THE INVENTION

Figure 1:
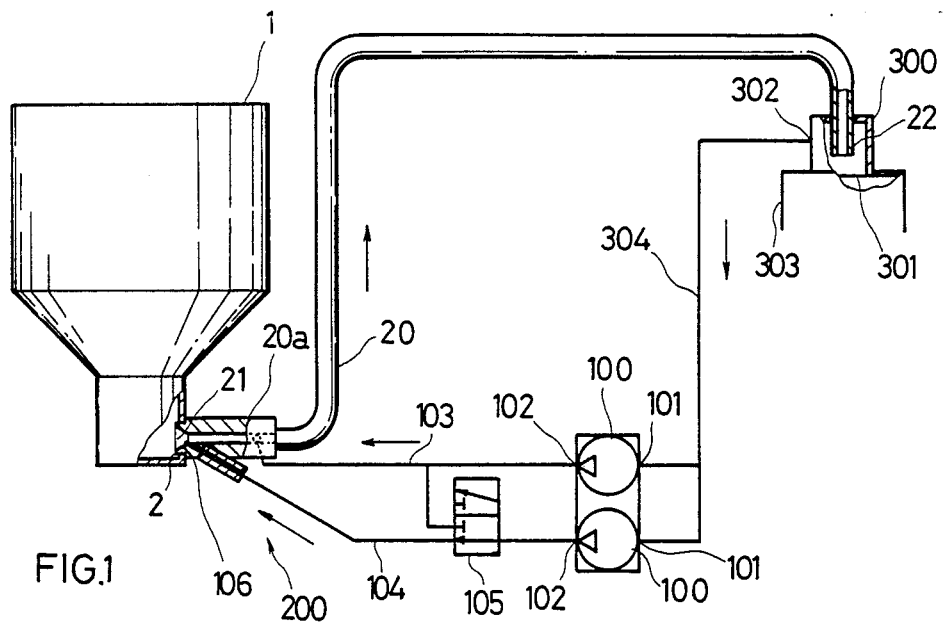
FIG. 1 is a partially sectional outline of system diagram of the 1st embodiment according to the present invention.

A description of the 1st embodiment according to the present invention as shown in FIG. 1 is made as follows:

The present apparatus for transporting the powdered or granular materials by the pneumatic force comprises mainly the storage vessel 1 storing the powdered or granular materials, the transport pipe 20 of smaller diameter having the bore 2-6 times as long as maximum length of the particle of the powdered or granular materials to be transported, the source of pneumatic force 100 for transporting the powdered or granular materials in the storage tank 1 through the transport pipe 20 to the destination, the powdered or granular floating means 200 of transporting the powdered granular materials by the pneumatic force, while they are kept to float at the inlet 21 of the transport pipe 20 or in vicinity of the inlet 21 thereof, the collector 300, provided at the outlet 22 of the transport pipe 20, for collecting the powdered or granular materials and the transporting gas in a separated manner.

Further detailed description of the afore-mentioned construction shows that the material outlet 2 is formed on the side wall (or the bottom) of the lower part of the storage vessel 1, a short transport pipe 20a partially constituting the transport pipe 20 is connected to communicate with the material outlet 2. An inner peripheral wall face of the short transport pipe 20a is tapered such that the more an progress from the inlet end side toward the outlet end side is made, the thinner it becomes. The inlet end of the transport of smaller diameter 20, made of plastic and flexible, whose bore is equal to that (for example, about 8 mm) of the short transport pipe 20a, is connected directly or indirectly to the outlet side of the transport pipe 20a. The outlet 301 of the collector 300 to which the outlet 22 of the transport pipe 20 is connected to communicate with a receiving part 303 of the powdered or granular materials of a plastic molding machine and the like, and suction ports 101 and 101 of one group of the vacuum pumps 100 and 100, acting as the source of pneumatic force, are connected by way of a conduit 304 to the exhaust port 302 of the collector 300. The exhaust port 102 of one vacuum pump (source of pneumatic force) 100 is connected by way of the conduit 103 to the short transport pipe 20a, while the exhaust port 102 of another vacuum pump (source of pneumatic force) 100 is connected by way of the conduit 104 and a selector valve 105 to a supplying port 106 of the gas for floating the powdered or granular materials which is formed on the short transport pipe 20a. In this embodiment the source of pneumatic force 100, the conduit 104, the selector valve 105, the gas supplying port 106 constitute the powdered or granular materials floating means 200.

A description of an action by this embodiment shows a drive of the vacuum pump 100, acting as the source of pneumatic force, allows the powdered or granular materials to be supplied from the storage vessel by way of the short transport pipe 20a, the transport pipe 20, and the collector 300 to the receiving part 303 of the powdered or granular materials. The transporting gas which is separated from the powdered or granular materials in the collector 300 is sucked in by the vacuum pump 100, some portion of such a gas is supplied to the short transport pipe 20a, while the reminder is intermittently supplied from the gas supplying port 106 to the short transport pipe 20a. Since the gas causes the powdered or granular materials in vicinity of the material outlet 2 of the storage vessel 1 to float, they do not lodge there. An intermittent supply of the gas to the gas supplying port 106 is due to the structure of the vacuum pump 100 from which the exhaust is intermittently made. Thus, since the exhaust from the vacuum pump 100 is utilized as the gas for floating the powdered or granular materials, the clogging of the outlet of the storage vessel or the vicinity of the inlet of the transport pipe 20 with them can be prevented at low costs.

In this embodiment since the transport pipe system employs a closed loop, the gas except for air such as nitrogen can be used as the transporting gas, and it is also possible to transport the powdered or granular materials which are apt to be easily damaged by the humidity under the predetermined dry state.

Figure 2:
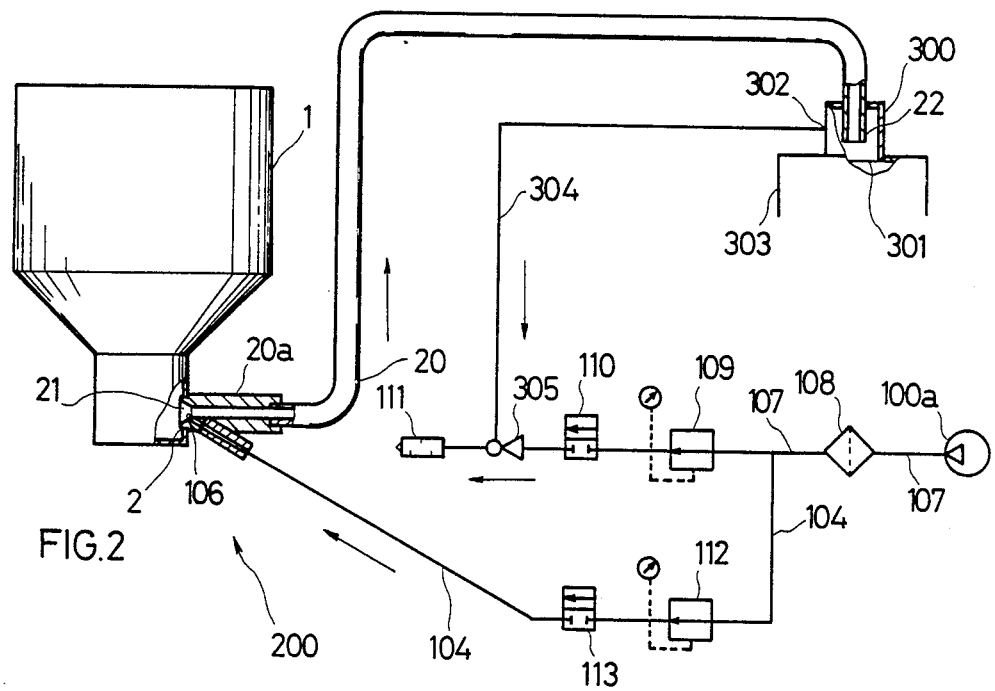
FIG. 2 is a partially sectional outline of system diagram of the 2nd embodiment according to the present invention.

A description of the 2nd embodiment according to the present invention as shown in FIG. 2 is made as follows. The symbols identical to that of FIG. 1 stand for the same members. A difference of the arrangement as shown in FIG. 2 from that of FIG. 1 lies in a gas supplying system running from the exhaust port 302 of the collector 300 to the short transport pipe 20a.

Namely, the exhaust port 302 of the collector 300 is connected by way of the conduit 304 to the suction port of a ejector 305, a discharge opening of the compressor 100a which pressurizes the actuating gas to be fed is connected to by way of the conduit 107, a filter 108, a regulator 109, and a solenoid valve 110 to the gas inlet of the ejector 305. A silencer 111 is connected to the exhaust port of the ejector 305.

The discharge opening of the compressor 100a is connected by way of the conduit 104 branching from the conduit 107, the regulator 112, the solenoid valve 113 which repeats the opening and the closing every the predetermined time to the gas supplying port 106.

A description of the action of the afore-mentioned apparatus is made as follows: The gas which is fed out from the compressor 100a to the gas supplying port 106 by the opening and the closing of the solenoid valve 113 is intermittently supplied to the inside of the short transport pipe 20a, whereby the powdered or granular materials in vicinity of the material outlet 2 of the storage vessel 1 is floated, and they do not lodge there.

Similarly to the 1st embodiment, the powdered or granular materials are supplied to the part 303 of receiving them. The transporting gas is discharged from the silencer 111 to the outside.

Figure 3:
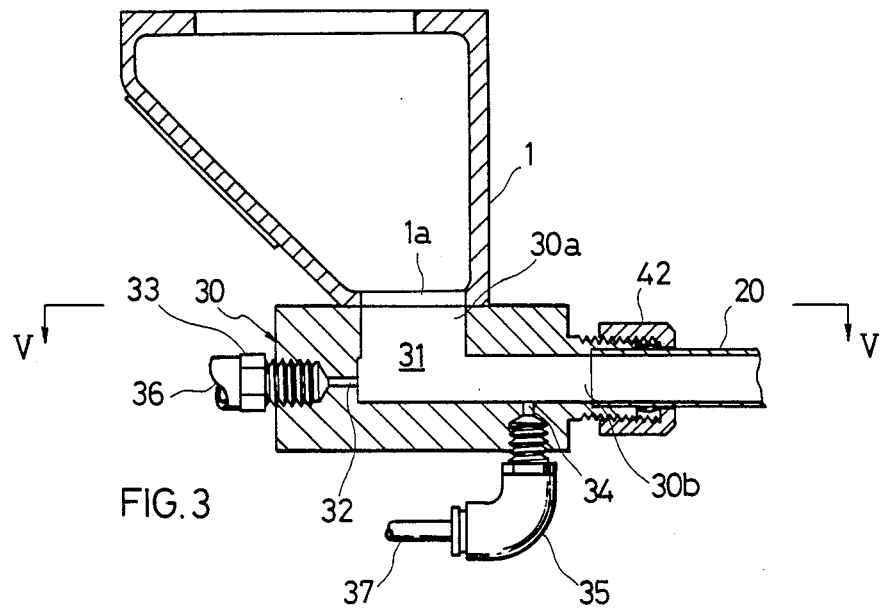
FIG. 3 is a partial longitudinal sectional view of the 3rd embodiment according to the present invention.
Figure 4:
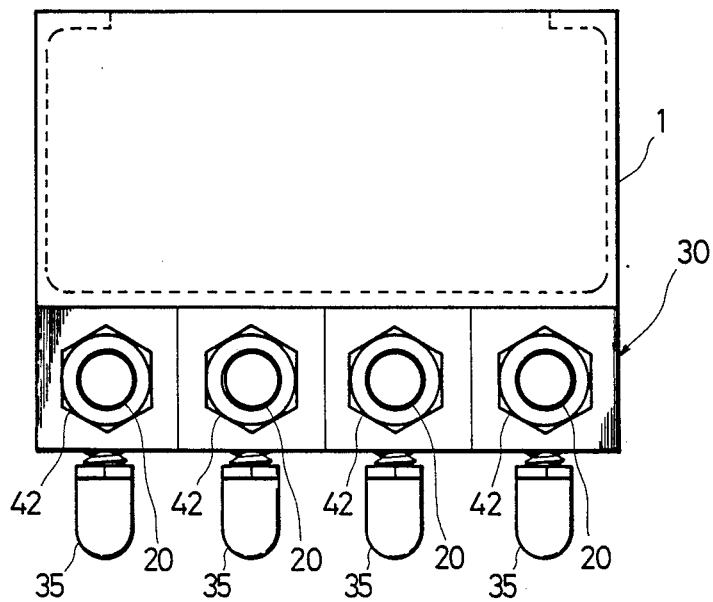
FIG. 4 is a right side view of FIG. 3.
Figure 5:
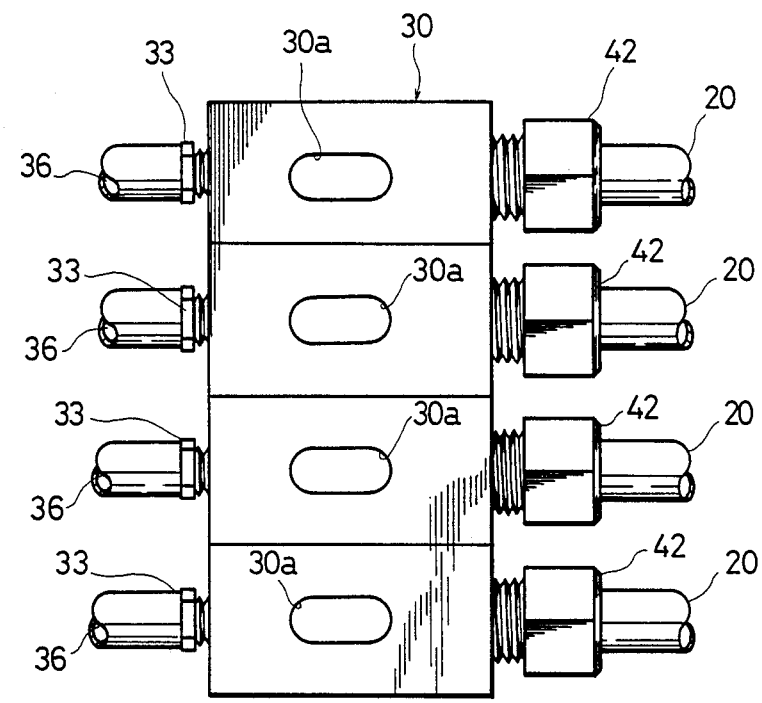
FIG. 5 is a partially omitted plan view taken on the line of V—V of FIG. 3.
Figure 6:
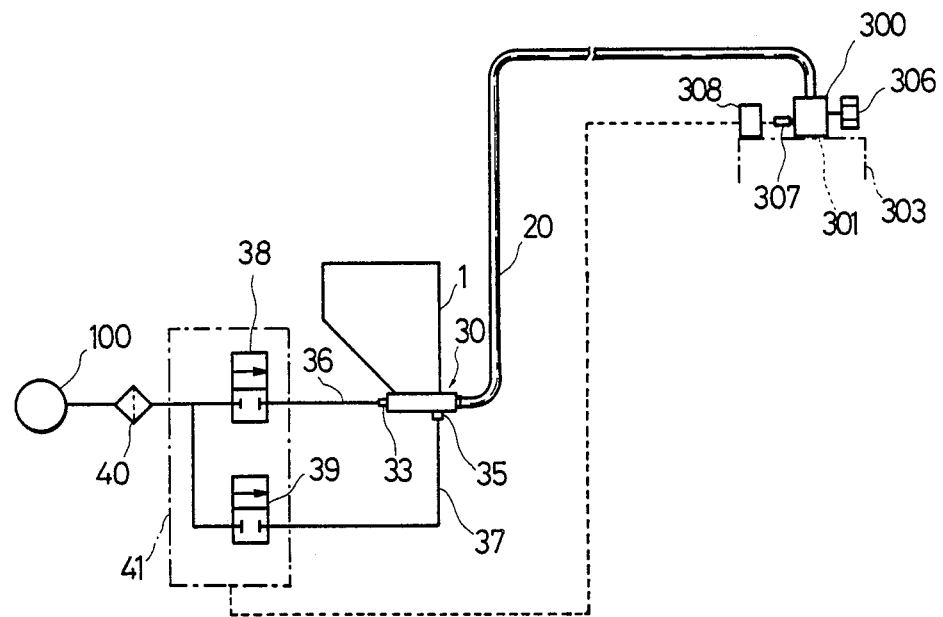
FIG. 6 is an outline of system diagram of the entire part.

A description of the 3rd embodiment according to the present invention as shown in FIGS. 3-6 is made as follows:

In this embodiment, as shown in FIG. 6, the apparatus for transporting the powdered or granular materials by the pneumatic force comprises mainly the storage vessel 1 such as a hopper, a silo and the like, a feeder 30, constituting some part of the transport pipe 20, which is connected to the inlet end of the transport pipe of smaller diameter 20, the transport pipe 20, the collector which is connected to the outlet end of the transport pipe 20, and the pressure-feed type of source of pneumatic force 100 such as compressor and the like, and transports the powdered or granular materials being supplied from the storage vessel 1 by the pneumatic force from the source of pneumatic force by way of the feeder 30 and the transport pipe 20 to the destination, i.e. the powdered or granular materials receiving part 303 of the synthetic resin molding machine and the like. In FIGS. 3-5, 4 units of transport pipes 20 are connected to the feeder 30, while FIG. 6 illustrates only one unit of transport pipe 20, the collector 300, and the powdered or granular receiving part 303 respectively with a partial ommission being made.

As shown in FIG. 3, a material supporting passage 31 having an inlet 30a which communicates with an exhaust port 1a of the storage vessel 1 and an outlet 30b which communicates with the transport pipe 20 is formed in the feeder 30 being connected to the storage vessel 1. As shown in FIG. 5, the inlets 30a of the feeder 30 (i.e. the inlet of the material transporting passage 30) take elliptic cross sections, whose throttle effect causes the material to be fed to be gas-transported such that it does not lodge, and, in that case, it is of course accepted that the inlets 30a take other shapes.

The 1st gas conducting hole 32 located at the upperstream side of the material transporting passage 31 and the 2nd gas conducting hole 34 located at the lowerstream side thereof are formed to communicate with the material transporting passage 31.

The 1st gas conducting hole 32 and the 2nd gas conducting hole 34 are connected by way of the joints 33 and 35 to the gas conduit 36 and the branch gas conduit 37, whose adequate positions·are equipped with the selector valves 38 and 39, and the top side of the positions to which the gas conduit 36 and the branch gas conduit 37 are connected is equipped by way of the filter 40 with the pressure feed type source of pneumatic force 100 such as the compressor. Element 41 is a control box in which the selector valves 38 and 39 are packaged.

The compressed gas out of the source of pneumatic force 100 which a drive of the pressure feed type source of pneumatic force 100 causes to be supplied by way of the filter 40, the gas conduit 36, and the joint 33 and from the 1st gas conducting hole 32 to the material transporting passage 31 pressure-feeds material which is supplied from the storage vessel 1 to the material transporting passage 31 to the side of the transport pipe 20, while the gas and the material are being mixed with each other. The compressed gas out of the source of pneumatic force 100 which is supplied by way of the filter 40, the branch gas conduit 37, and the joint 35 and from 2nd gas conducting hole 34 to the material transporting passage 21 causes its being supplied upon completion of transporting the material to transport the material to be transported, residual in the material transporting passage 31 and the transport pipe 20, to the destination, thereby preventing the same from being fixed therein.

The transport pipe 20 is connected to the lowerstream side of the feeder 30 by connecting members such as nuts 42. According to an experimental example by the present inventors, if the transport pipe 20, whose bore, material, length, and the like may be adequately selective, is defined its bore to be smaller to read 2-6 times as long as maximum length of the particle of the powdered or granular materials to be transported, the material can be stably transported without clogging the inside of the material transporting passage 31 of the feeder 30 with the same.

In the case where the bore of the transport pipe 20 is smaller, if it is constructed into a tube-shape with flexible (elastic) material such as the plastic and the like being used, the material can be transported to the destination by smaller wind volume and at slow wind speed, resulting in an advantageousness that the piping space is made compact.

In FIG. 6, element 306 is an exhaust filter, and element 307 is a level instrument, whose switching between ON and OFF can be performed by a switch (not shown) being connected to the control box 41, and in this embodiment, a switch (not shown) in a relay box 308 which is placed on the powdered or granular materials receiving part 303 is adapted to perform such a change-over.

Figure 7:
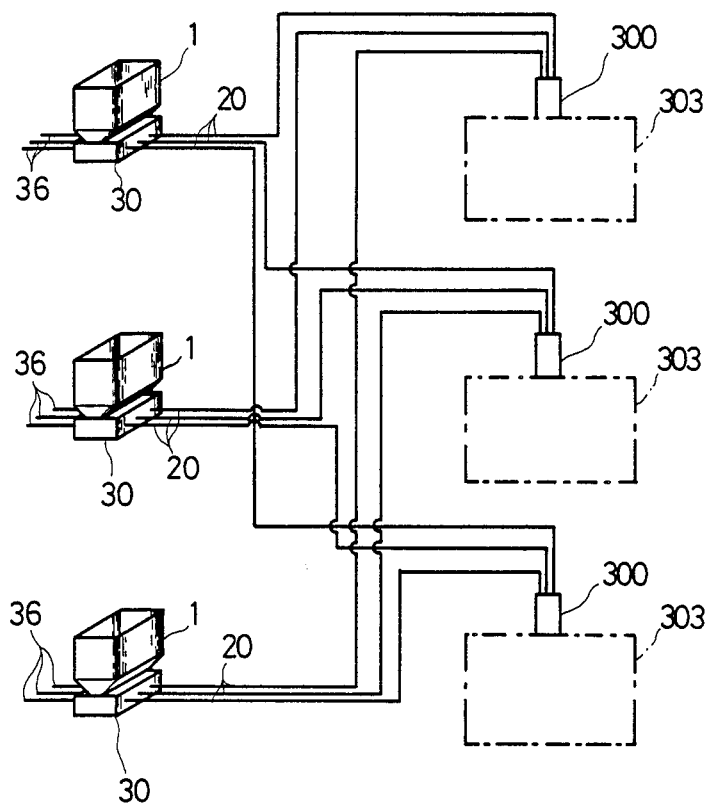
FIG. 7 is an outline of system diagram of other example to which the 3rd embodiment according to the present invention is applied.

A description of the pneumatic transporting apparatus wherein the construction being illustrated in FIG. 7, the same original transporting place as those of FIGS. 3-5 is employed, while the transporting destination, different from that of FIG. 6, is systematized, is made as follows:

Such an apparatus, which transports a plurality of different powdered or granular materials, being distributed and mixed at the same time, to a plurality of receiving parts 303 of the synthetic resin molding machines by the pneumatic force, can adopted to be constructed into a pressure-feed or suction type.

Namely, an arrangement is employed in which the storage vessels 1 are connected onto a plurality of feeders 30 respectively, formed similarly to the 3rd embodiment, a plurality of transport pipes 20, (specified entirely as 3 units in FIG. 7, and, for example, an option at 2 units or 4 units being accepted, a further alternative is also that their number is made different every the feeder 30), are connected to the feeders 30 respectively, and each of collectors 300 is equipped with the transport pipe 20 from any of different feeders 30, whereby the different powdered or granular materials, being adequately distributed and mixed, can be transported to the different receiving parts 303 respectively by the pneumatic force.

In this embodiment, in the case of performing the pneumatic transforming under the pressure-feed type, as shown in FIG. 6, the requirement is to equip the feeder 30 with the source of pneumatic force 100, the gas conduit 36, the branch gas conduit 37, the filter 41 and the like, while, in the case of performing the pneumatic transforming under the suction type, the requirement is that the force of pneumatic force is provided by way of a suction gas conduit on the side of the collector 300 and that the gas conduit, the filter, the branch gas conduit, the selector valve, the force of pneumatic force and the like are provided on the side of the feeder 30.

With respect to the system of connecting the gas conduit 36 and the branch gas conduit 37 to the 1st gas conducting hole 32 and the 2nd gas conducting hole 34 respectively, the connecting system between the feeder 30 and the transport pipe 20, and the shape of the storage vessel 1, variations in design thereof may be allowed in addition to the illustration.

In the 3rd embodiment, 4 units of material transporting passages 31 are formed onto one unit of feeder 30, and, in that case, the number of such passages 31 may be one unit, two units, three units, or over five units.

Figure 8:
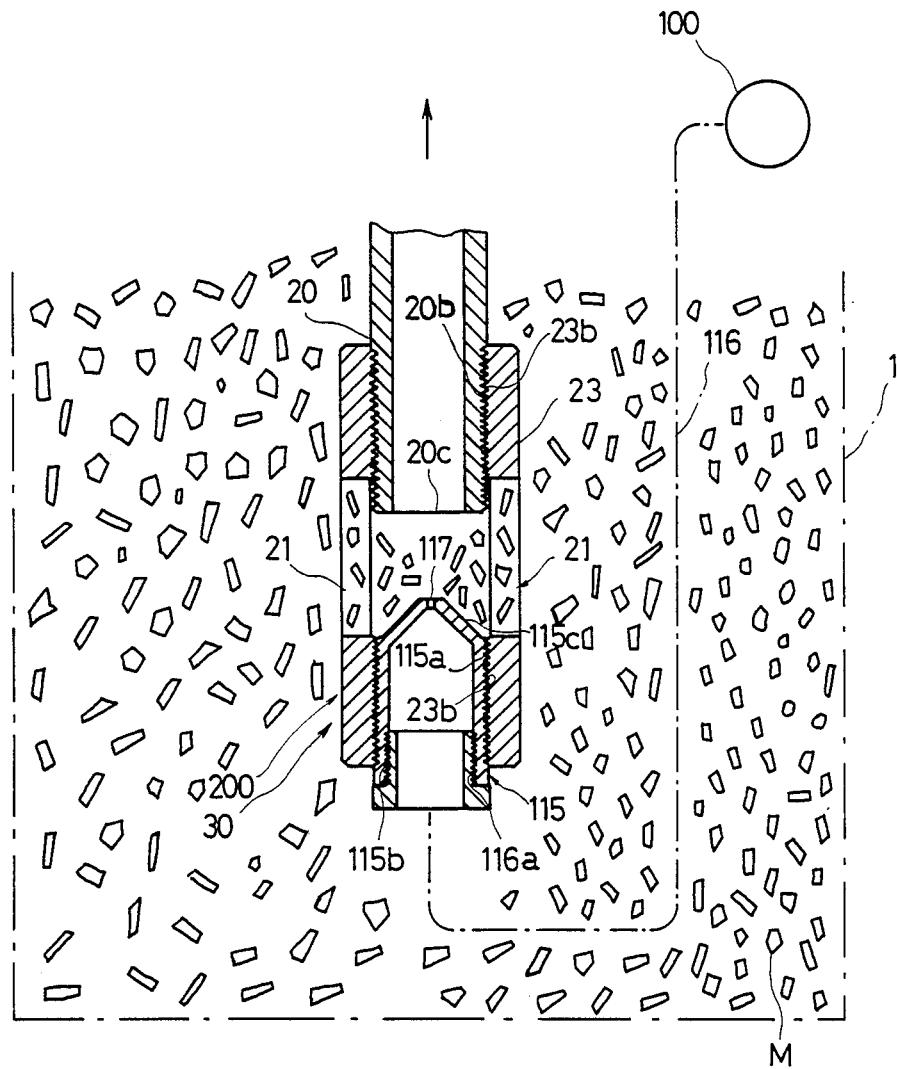
FIG. 8 is a partial longitudinal sectional view of the 4th embodiment according to the present invention.
Figure 9:
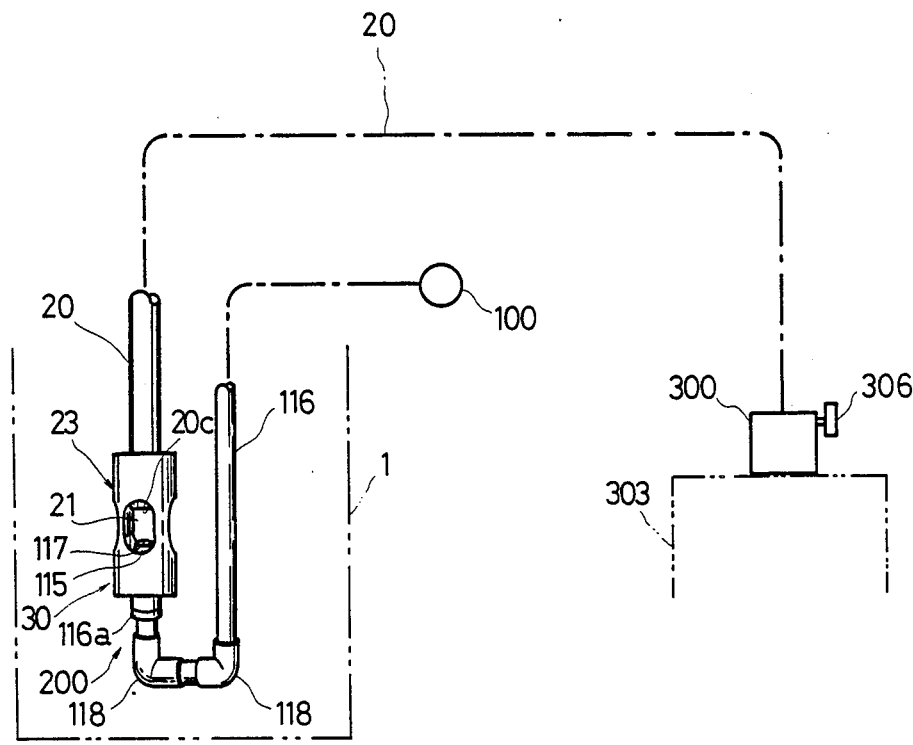
FIG. 9 is an outline of system diagram of the 4th embodiment according to the present invention.

A description of the 4th embodiment according to the present invention as shown in FIGS. 8 and 9 is made as follows:

FIG. 8 is a partial longitudinal sectional view of the state where the feeder 30, as the original transporting place, which is in use for the pneumatic transporting apparatus for the powdered or granular materials according to the present invention is inserted into the storage vessel 1 containing the powdered or granular materials such as the plastic pellet type and the like, while FIG. 9 is an outline of system diagram of an example to which the feeder 30 is applied.

The feeder 30 comprises the transport pipe 20 of smaller diameter having the bore 2–6 times as long as maximum length of the particle of the powdered or granular materials M to be transported, the joint 23, partially constituting the transport pipe 20, which is formed on the lower end part of the transport pipe 20, a male screw 20b and a female screw 23b being thread-connected to each other, the nozzle 115, located on the lower end side of the joint 23, wherein the female screw 23b and the male screw 115a are thread-connected to each other, and the source of pneumatic force 100, such as the compressor and the blower, which is connected by way of an air supply conduit 116 to the nozzle 115. The jet port 17, which is formed on the top end of the nozzle 115, is opposited to communicate with the material inlet 20c of the transport pipe 20. Over one unit of material inlets 21, of elliptic shape and the like, which permit the jet port 117 of the nozzle 115 and the material inlet 20C of the transport pipe 20 to communicate with each other, are formed on the central parts between the opposite side walls of the joint 23. In the upper end side of the air supply conduit 116 by way of which the source of pneumatic force 100 and the nozzle 115 are connected to each other, the arrangement is made in which the female screw 115b of the nozzle 115 and the male screw 116a located at one end side of the air supply conduit 116 are thread-connected to each other. As shown in FIG. 9, to the position slightly lower than the position where such a thread-connection is made, the upper end part of the air supply conduit 116, being bent, is connected by way of an elbow 118.

In this embodiment, since a possibility of being movable of the transport pipe 20 and the nozzle 115 with respect to the joint 23 with the thread-connection being used between them enables a motion of the lower end part of the transport pipe 20 to be accompanied with a concurrent motion of the top end part of the transport pipe 20 which is directed from the upper end part of the material inlet 21 of the joint 23 toward the lower side and since such a possibility enables also a motion of the nozzle 115 to be accompanied with a motion of the nozzle controlling member 115C which is directed from the lower end part of the material inlet 21 of the joint 23 toward the upper side, the powdered or granular material from the material inlet 21 is easily sucked into the inlet side of the transport pipe 20 and is loosened there, whereby they can be transported without their lodging there.

FIG. 9 illustrates an example to which the feeder, being used for transporting the powdered or granular materials M to an optional destination, is applied, and the receiving part 303 of the synthetic resin molding machine is connected by way of the collector 300 to the terminal end side of the transport pipe 20.

Figure 10:
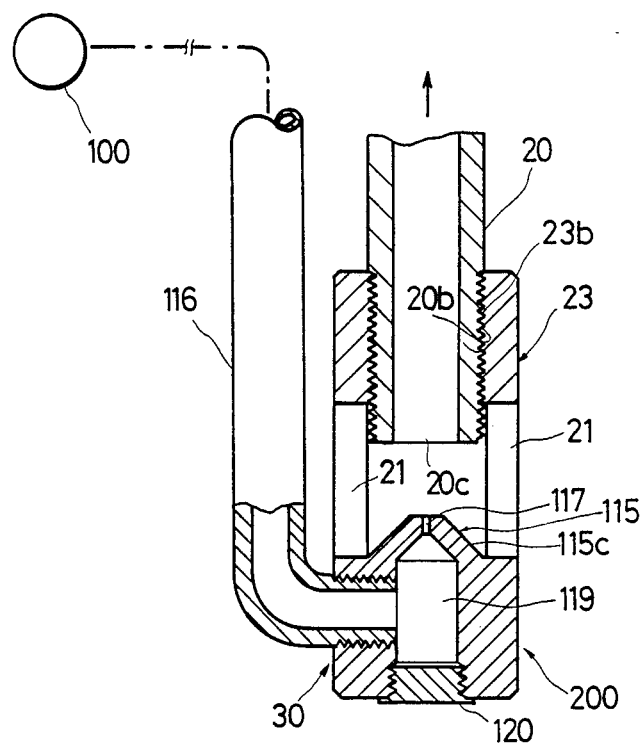
FIG. 10 is a longitudinal sectional view of a modified example of the feeder acting as the powdered or granular transporting means located at the original transporting place.

FIG. 10 illustrate a modified example of the feeder acting as the powdered or granular floating means located at the original transporting position. This example has the same construction as that of the 4th embodiment with some points of exceptions in which while the nozzle 115 and the joint 23 are formed integrally, and the gas passage 119 communicating with the jet hole 117 is closed by a cock 120, the one end of the air supply conduit 116 being connected to the force of pneumatic force 100 is connected to communicate with the lower and side wall of the joint 23 in which the gas passage 119 is formed.

Figure 11:
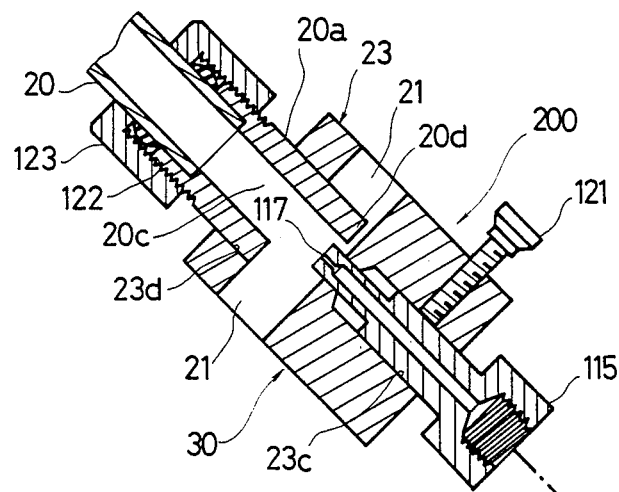
FIG. 11 is, similarly to FIG. 10, a longitudinal sectional view of a further other modified example of the feeder.

FIG. 11 illustrates other modified example of the feeder acting as the powdered or granular floating means located at the original transporting position. This example employs a construction in which the nozzle 115 is movably provided in a nozzle inserting hole 23C which is made in the lower part of the joint 23, whereby a position of the jet hole 117 which is directed to the inlet 20C of the transport pipe 20 is adapted to be changed. Element 121 is a positioning screw for the nozzle 115. Furthermore, the short transport pipe 20a partially constituting the transport pipe 20 and working as a short connection pipe at the same time is fitted in a insertional manner into an inserting hole 23d which is formed in the upper side of the joint 23, and while the transport controlling member 20d of adequate length is formed to be extruded from a partial portion of the lower end part of the short transport pipe 20a, the male screw 122 is formed in the upper part of the short transport pipe 20a. The further construction is that the lower end part of the transport pipe 20 is fitted in an insertional manner into the upper part of the short transport pipe 20a, and the short transport pipe 20a and the lower end part of the transport pipe 20 are fixed by a fastening tool 123 such as a nut and a band. In this embodiment, the short transport pipe 20a can be movable with respect to the joint 23.

The transport pipe 20 can be, as shown in FIGS. 8 and 9, mounted directly to the joint 23, and, as shown in FIG. 11, it can be mounted by way of the short transport pipe 20a indirectly to the joint 23.

The afore-mentioned 1st–4th embodiments are common to one another in terms of the arrangement in which as the powdered or materials floating means for transporting the powdered or granular materials by the pneumatic force with the transport pipe of smaller diameter used in such a manner that the powdered or granular materials do not lodge in the transport pipe, an injection of the gas such as the compressed gas at the inlet of the transport pipe or in vicinity of the inlet thereof is used.

Figure 12:
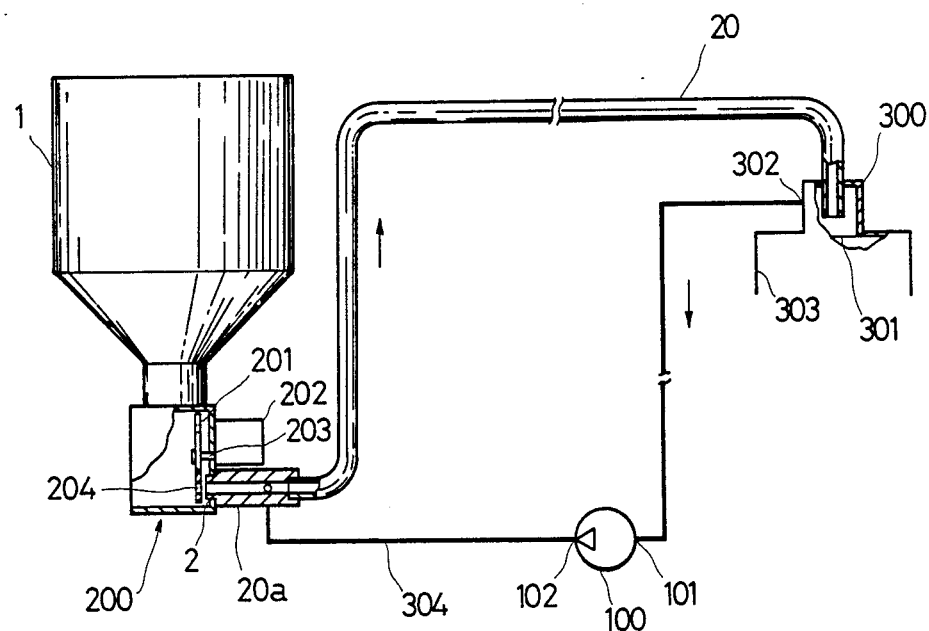
FIG. 12 is an outline of system diagram of the 5th embodiment according to the present invention.
Figure 13:
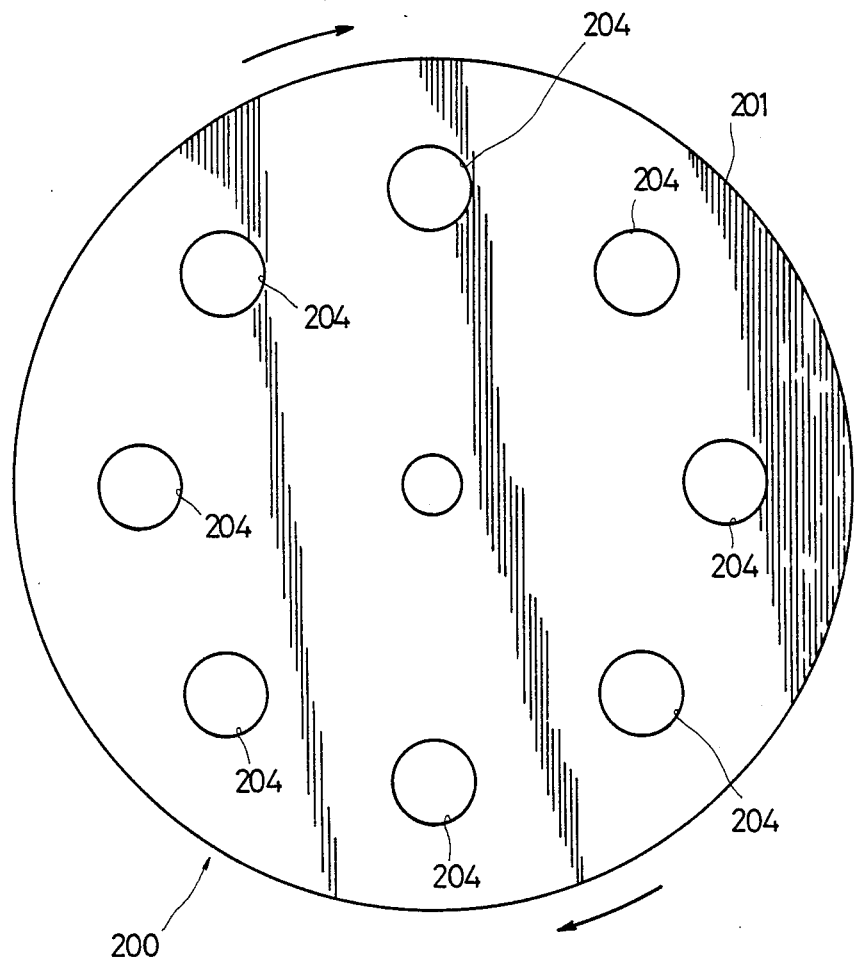
FIG. 13 is a left side view of the rotational plate in FIG. 12.
Figure 14:
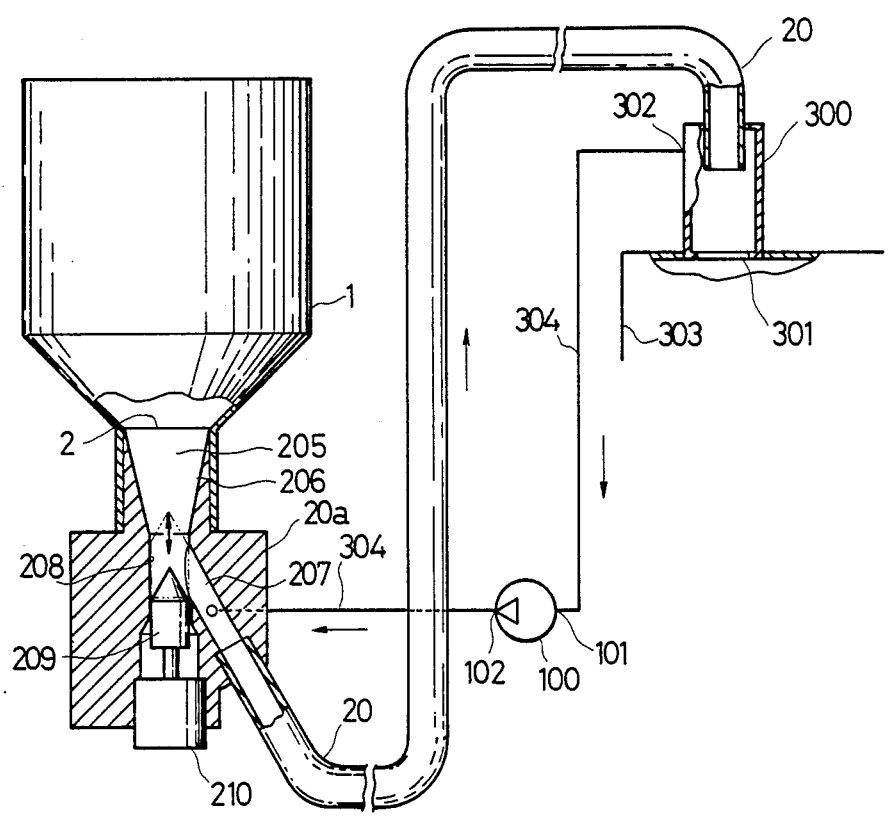
FIG. 14 is an outline of system diagram of the 6th embodiment according to the present invention.
Figure 15:
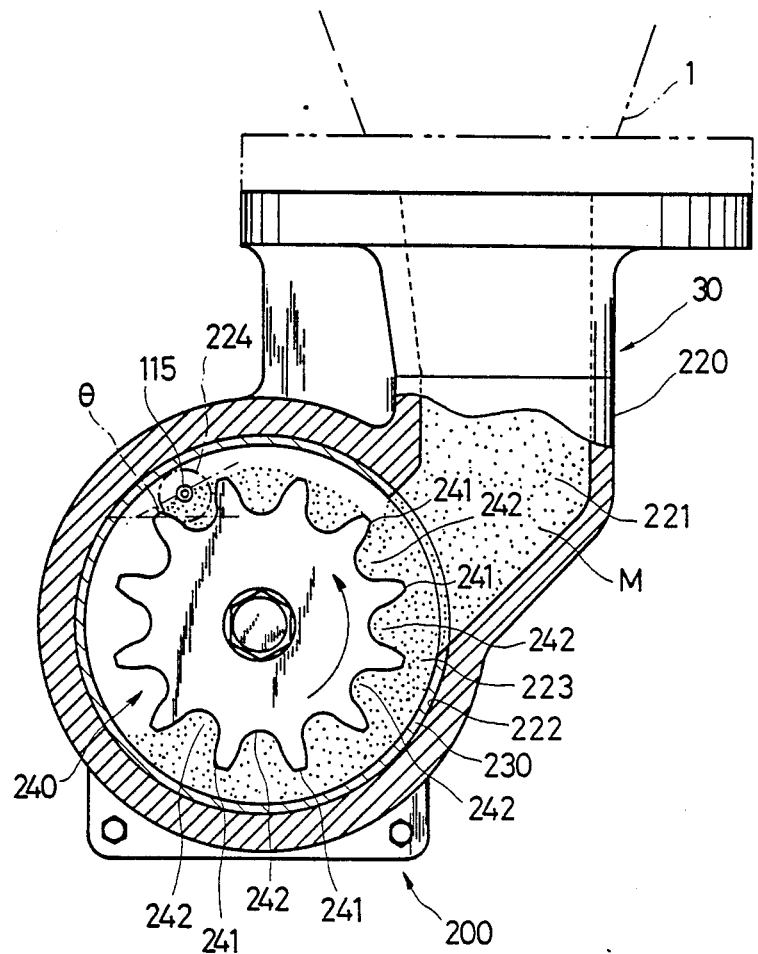
FIG. 15, illustrating the 7th embodiment according to the present invention, is a longitudinal sectional view, taken from the left side face of FIG. 16, of the principal part of the original transporting place.
Figure 16:
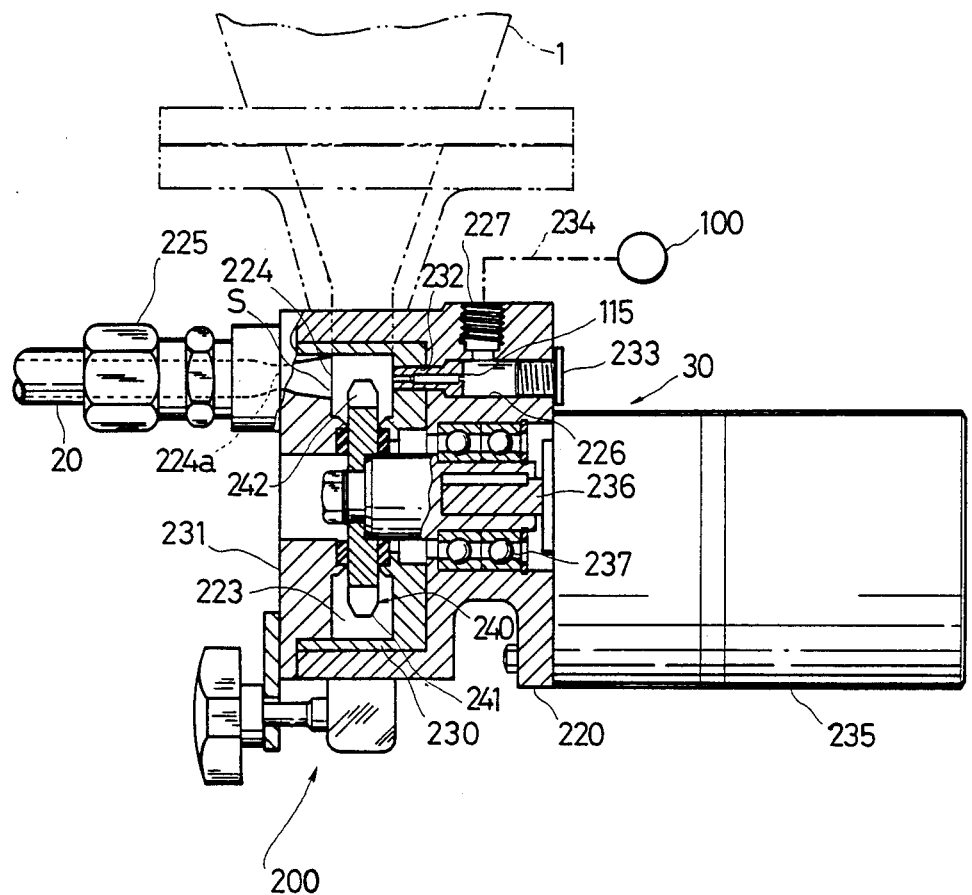
FIG. 16 is a front view of the original transporting place which is shown by a partially cut-away section.

In contrast with that, the 5th embodiment of FIGS. 12 and 13 and the 6th embodiment of FIG. 14 are common to one another in terms of the arrangement in which as the powdered or granular materials floating means 200, the rotational plate or the actuating article comprising the reciprocating movable article is mechanically actuated, thereby transporting the powdered or granular materials, being floated, without their lodging.

The construction of the 5th embodiment is approximately identical to that of the 1st embodiment with the exceptional characteristics in which as the powdered or granular floating means 200, the rotational plate 201, the detailed description of which is made as mentioned below, is used and as the source of pneumatic force 100, one unit of vacuum pump is provided.

Namely, a motor 202 is mounted to the upper part of the side wall in which the material outlet 2 of the storage vessel 1, the output shaft 203 of the motor 202, being in parallel with a center of the material outlet 2, penetrates the side wall on the lower part of the storage vessel 1, and the under-mentioned rotational plate 201 is mounted to the shaft end part of the output shaft 203. As shown in FIG. 13, 8 units of openings 204 are provided to be spaced with 45' —intervals being left on the peripheral end area of rotational plate 201, and a rotation of the rotational plate 201 causes these opening 204 to communicate with the material outlet 2. It is accepted, only if there is provided at least one unit of opening 204. The suction port 101 of the vacuum pump acting as the source of pneumatic force is connected by way of the conduit 304 to the exhaust port 302 of the collector 300 of the powdered or granular materials and the exhaust port 102 of the vacuum pump 100 is connected by way of the conduit 304 to the short transport pipe 20a.

A description of action by this embodiment is made as follows: When a drive of the vacuum pump 100 causes the powdered or granular materials to be supplied from the storage vessel 1 through the short transport pipe 20a, the transport pipe 20, and the collector 300 to the receiving part 303 of the powdered or granular materials, a rotation of the rotational plate 201 at the predetermined speed (e.g. 20 rotational frequency per minutes) causes the powdered or granular materials to float, whereby the powdered or granular materials in vicinity of the material outlet 2 (in front of the inlet of the transport pipe 20) of the storage vessel 1 acting as the original transporting place are smoothly guided to the short transport pipe 20a.

After the powdered or granular materials transporting gas reaches the collector 300, it is separated from the powdered or granular materials, sucked in by the vacuum pump 100, and is supplied to the short transport pipe 20a. Other points of the present action are identical to those of the 1st embodiment.

In the construction of the 6th embodiment, the short transport pipe 20a, partially constituting the transport pipe 20, is fitted into the material outlet 2 of the storage vessel 1, the powdered or granular passage 205 penetrates vertically the short transport pipe 20a and is formed to have a tapered section 206 which becomes more narrow in proportion to a progress from the inlet end toward the lower side, an introducing part 207 of the powdered or granular materials is continuously formed onto the lower end of the tapered section 206 in an inclined manner, and the inlet end of the transport pipe 20 of smaller diameter is connected directly or indirectly to the outlet end of the introducing part 207.

In the short transport pipe 20a, sharing a shaft center with the tapered section 206, the reciprocating movable article housing section 208 in continuity of the tapered section 206 is formed, and the under-mentioned reciprocating movable article 209 is vertically movably housed into the reciprocating movable article housing section 208. Namely, the reciprocating movable article 209 has its upper part formed into a conical shape, and performs a reciprocating movement with a predetermined cycle established and with a help from the fluid pressure cylinder 210 which is mounted to the lower side of the reciprocating movable article housing section 208. So long as the reciprocating movable article 209 is vertically movably along the powdered or granular passage 205, its reciprocating movable article housing section 208 does not need to share the shaft center with the tapered section 206. In addition, as a drive unit for the reciprocating movable article 209, except for the fluid pressure cylinder 210, variations in the design thereof may be allowed. Similarly to FIG. 13, the collector 300 is connected to the outlet end of the transport pipe 20, and the collector 300 is equipped with the elements in order of the receiving part 303, the conduit 304, the source of pneumatic force, and the introducing part 207 of the short transport pipe 20a.

A description of an action by this embodiment is made as follows: Similarly to the case of the 6th embodiment as mentioned above, a drive of the source of pneumatic force 100 causes the powdered or granular materials in the storage vessel 1 to be supplied by way of the powdered or granular materials passage 205, the introducing part 207, the transport pipe 20, and the collector 300 to the receiving part 303 of the powdered or granular materials. At that time, the reciprocating movable article 209 is vertically moved by a drive of the fluid pressure cylinder. Namely, when the reciprocating movable article 209 is moved up, it is extruded into the powdered or granular materials passage 205, while, when it is moved down, it makes a retreat to the reciprocating movable article housing section 208, thereby floating the powdered or granular materials so that the powdered or granular materials in vicinity of the material outlet 2 (in front of the inlet of transport pipe 20) of the storage vessel 1 are smoothly guided to the introducing part 207.

After the powdered or granular materials transporting gas reaches the collector 300, it is separated from the powdered or granular materials, is sucked in by the vacuum pump 100, and is guided to the introducing part 207.

In this embodiment, the system of transport pipe is a closed loop, so as the transporting gas, the gas, such as the nitrogen, except for the air can be used, and it is possible to transport the powdered or granular materials which are easily damaged by the humidity under the predetermined dry state. The embodiment may be, of course, applied to the pneumatic transporting apparatus into which the closed loop type of transporting system is incorporated, and the retreat of the reciprocating movable article from the powdered or granular materials made at its downward motion in the embodiment does not always need to be complete retreat.

Figure 17:
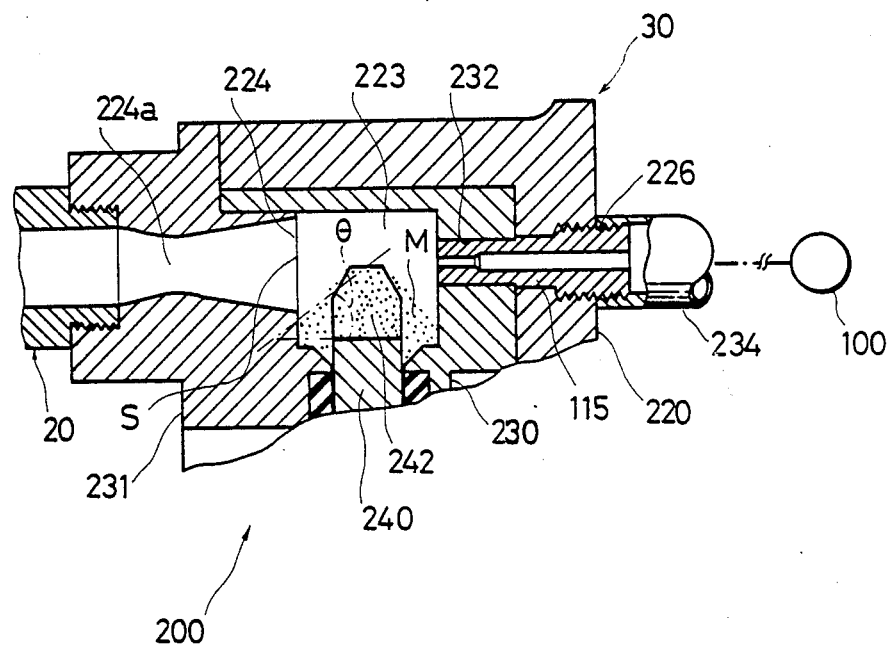
FIG. 17 is a partial longitudinal sectional view of a modified example of the vicinity of the nozzle.
Figure 18:
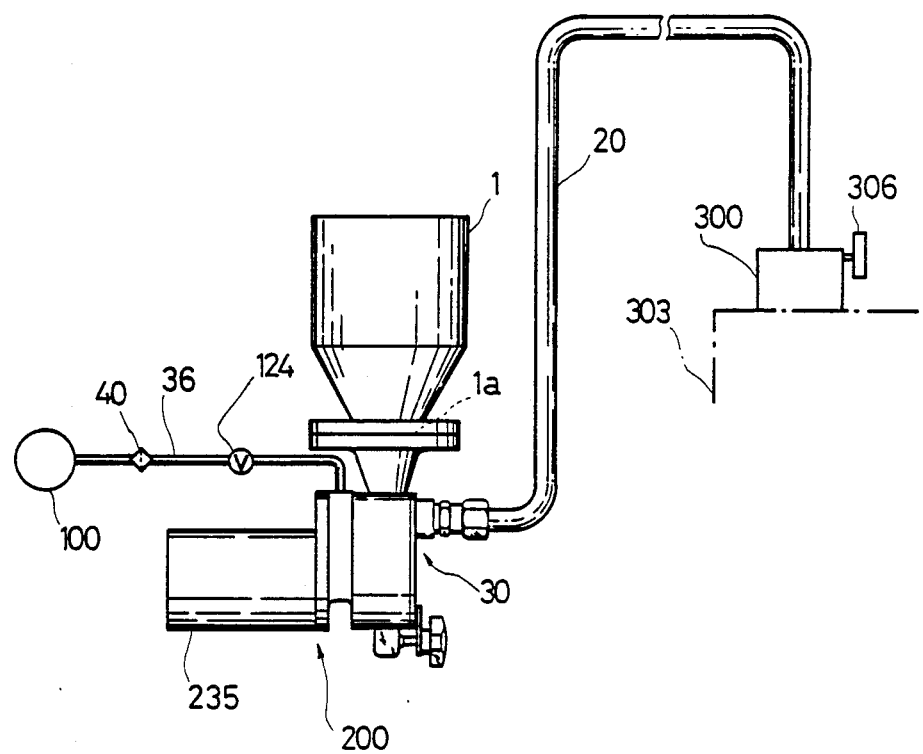
FIG. 18 is an outline of system diagram of an example to which the 7th embodiment according to the present invention is applied.
Figure 19:
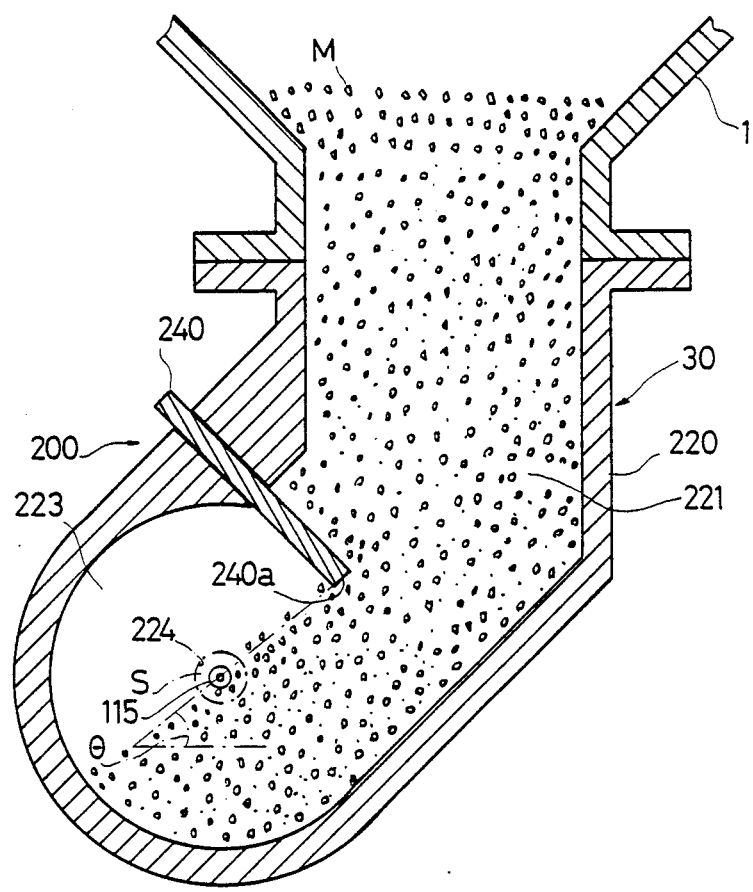
FIG. 19 is a partial longitudinal sectional view of the original transporting place of the 8th embodiment according to the present invention.
Figure 20:
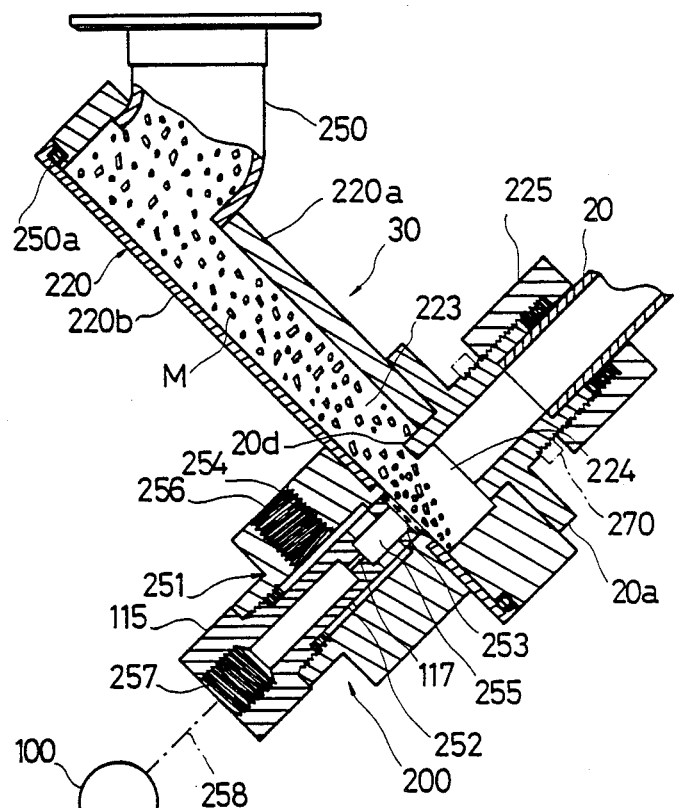
FIG. 20 is a partial longitudinal sectional view of the original transporting place of the 9th embodiment according to the present invention.
Figure 21:
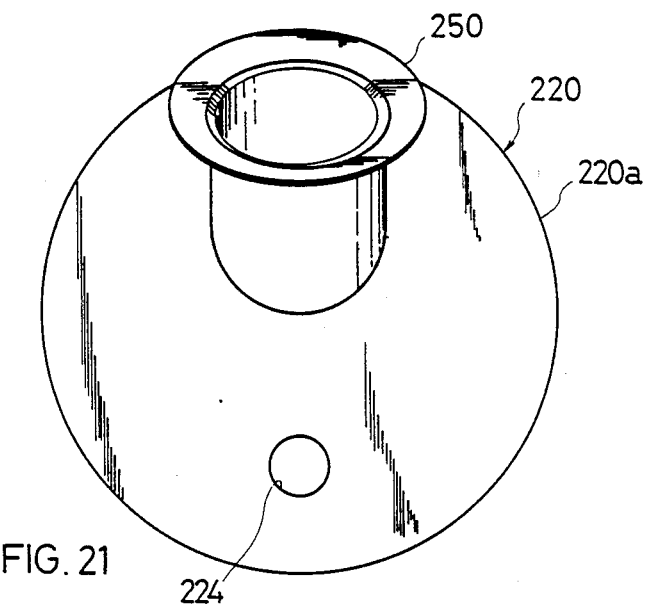
FIG. 21 is a reduced plan view of the feeder in FIG. 20.
Figure 22:
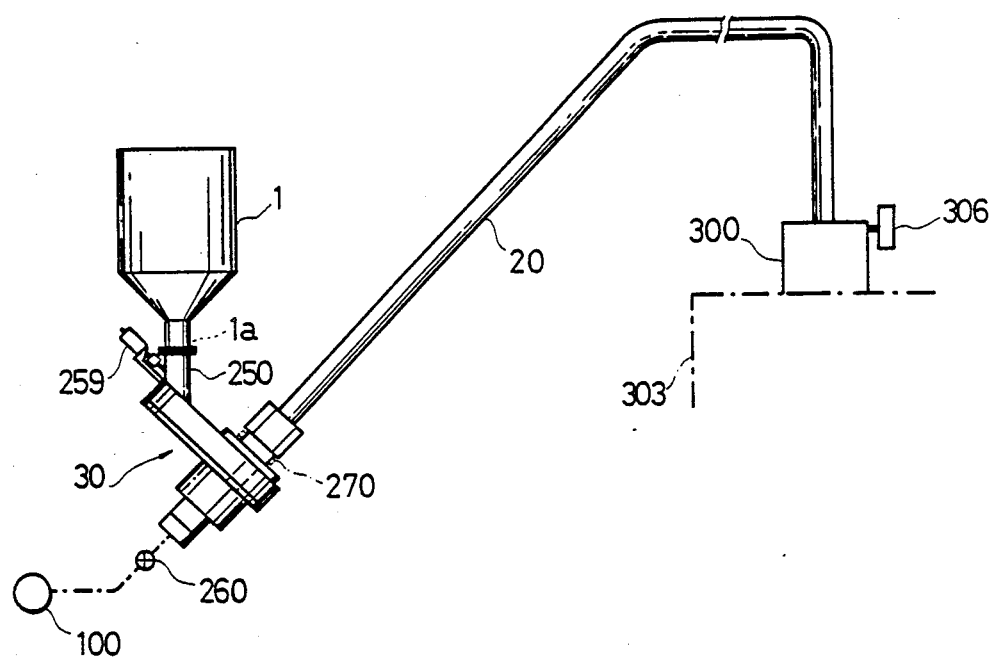
Figure 23:
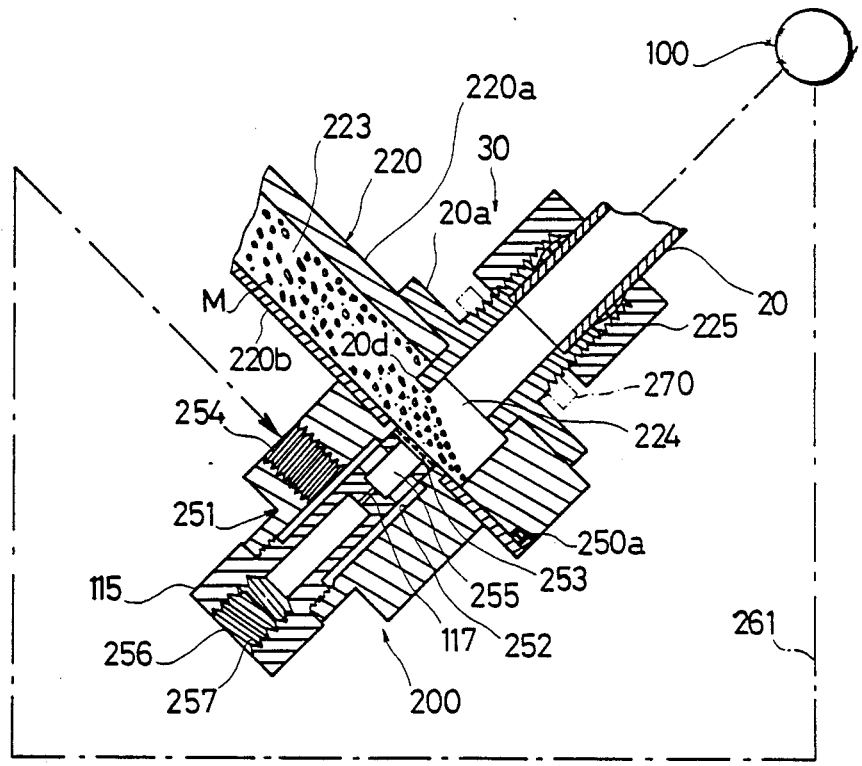
FIG. 23 is a longitudinal sectional view of the feeder of the 10th embodiment according to the present invention.
Figure 24:
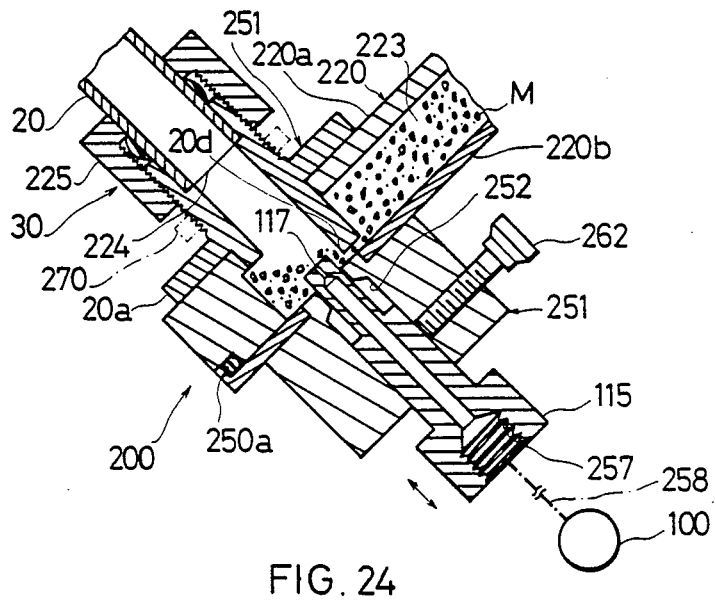
FIG. 24 is a longitudinal sectional view of the feeder of the 11th embodiment according to the present invention.
Figure 25:
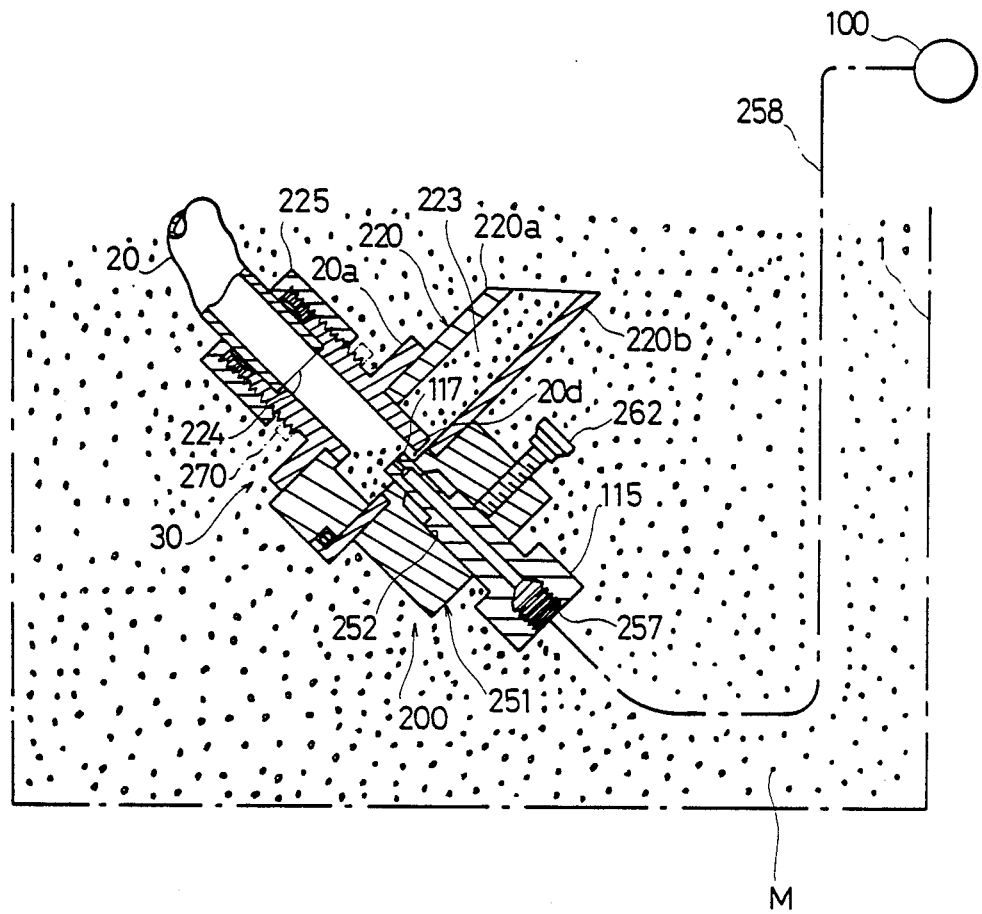

All of the 7th embodiment of FIGS. 15–18, the 8th embodiment of FIG. 19, the 9th embodiment of FIGS. 20–22, the 10th embodiment of FIG. 23, and the 11th embodiment of FIGS. 24 and 25 are common to one another in terms of the arrangement in which as the powdered or granular floating means 200, both of the actuating article comprising the rotor, the partition plate and the like and the injection of the gas such as the compressed gas and the like are actuated, thereby transporting the powdered or granular materials, being floated, without their lodging.

The pneumatic transporting apparatus of the 7th embodiment (FIGS. 15–18) comprises mainly the feeder proper 220 which includes the material conducting passage 221 being vertically formed and the approximately cylindrical space 223 being formed to communicate with the material conducting passage 221 at its eccentric position, a cylindrical inner sleeve with a bottom 230 which is fitted into the space 223, a lid 231 covering both the openings of the cylindrical space 223 of the inner sleeve 230 and the feeder proper 220, and the angle of repose restricting member (i.e. the rotor in this embodiment) 240 which is rotatably provided in the material housing chamber 223 surrounded by the inner sleeve 230 and the lid 231.

The material housing chamber 223, taking an eccentric position from the material conducting passage 221 located at the upper-stream side thereof, is formed to communicate with the material conducting passage 221, the material outlet 224 is formed in the adequate place (i.e. the part in the upper side in this embodiment) of the material housing chamber 223, the middle part of the material outlet 224 is throttled so that it becomes a smaller bore, and the top end of the material outlet 224 is equipped with the transport pipe 20 of smaller diameter by a fastening member 225 such as the nut.

The nozzle 115 being connected to the source of pneumatic force 100 such as compressor and the blower is provided at the position opposite to the material outlet 224. Namely, the nozzle 115 is inserted into a nozzle guiding hole 226 being made in the feeder proper 220 opposite to the side of the lid 231 such that the nozzle 115 may be freely taken out and in and is held to be fitted in and insertional manner between the nozzle guiding hole 226 and the nozzle guiding hole 232 made in the inner sleeve 230. In a direction of crossing the former nozzle guiding hole 226, a gas introducing hole 227 which introduces the gas from the source of pneumatic force 100 is formed. For this reason, when pressure-transporting the material by the pressure-feed type source of pneumatic force, closing of the part near the outer end of the nozzle guiding hole 226 by a cock 233 preventing a leakage of the compressed gas from taking place, the compressed gas is fed in, flowing along the route in order of the gas introducing hole 227, the nozzle guiding hole 226, and the nozzle guiding hole 232. When suction-transporting the material by the suction type source of pneumatic, the nozzle 115 is taken off, the gas introducing hole 227 directed to the nozzle 115 is utilized as a secondary air intake, and the terminal side of the transport 20 is equipped with the suction type source of pneumatic force such as the vacuum pump. Thus, in this embodiment, a contrivance lies in a possibility of transporting the material not only under the pressure-feed type but under the suction type, and, in that case, if a structure is employed in which the nozzle is not detachably mounted but fixed, of course, the suction type transporting becomes impossible. As shown in FIG. 17, under the arrangement in which the gas introducing hole 227 of the 7th embodiment is not provided, the nozzle guiding hole 226 acting as a role of such a hole 227, and the nozzle guiding hole 226 is equipped with the gas conduit 234 being connected to the source of the pneumatic force, there are possibilities not only of executing the pressure transporting but also where with the nozzle 115 and the gas conduit 234 being taken off, similarly to the afore-mentioned case, the suction transporting may be executed.

A drive shaft 236 for source of drive 235 is rotatably supported onto the feeder proper 220 under the nozzle guiding hole 226, and the top end of the drive shaft 236 is connected to the angle of repose restricting member 240, thereby rotating the angle of repose restricting member 240.

The rotor working as the angle of repose restricting member 240 has its circumferential direction equipped radially with a multiplicity of gear teeth 241, 241 . . ., and possesses a multiplicity of material housing recessed parts 242 which are formed between gear teeth 241. The number of the material housing recessed parts 242 may be allowed to be only one with option of its shape being also allowed.

The material M being supplied from the storage vessel 1 enters by way of the material conducting passage 221 of the feeder proper 220 into the material housing chamber 223, a partial portion of the material M enters into the material housing recessed parts 242, 242 . . . of the rotor constituting the angle of repose restricting member 240 and a rotation of the angle of repose restricting member 240 causes the material M to be moved in a predetermined direction (i.e. counterclockwise in FIG. 1). When the material housing recessed part 242 which houses the material M comes onto a prolongation of the material outlet 224, the surface of the material M to be transported which, being housed in the material housing recessed part 242, has a fixed angle of repose, is constructed to be faced within the scope of the open sectional area S of the material outlet 224 which is formed in the material housing chamber 223. For this reason if the compressed gas is jetted from the nozzle, when the material M to be transported reaches a position where it is faced within the scope of the open sectional area S of the material outlet 224, negative pressure caused by such a jet allows the material M to be sucked in, thereby transporting the same through the transport pipe 20 in a stable manner. In that case, since a change in ratio of mixing and transporting concentration is subject to the magnitude, the length, and the pressure loss of the transport pipe 20, the physical properties of the material M to be transported, if the ratio of mixing and the transporting concentration are required to meet the desired condition, in order that the position at which the material housing recessed part 242 of the angle of repose restricting member 240 is faced to the material outlet 224 is adjusted, the necessary arrangement is that the positional height of the material housing recessed part 242 being opposite to the material outlet 224 is changed, or that a position of forming the material outlet 224 is changed with the position of the material housing recessed part 242 being constant, whereby an adequate adjustment of the surface of the material M to be transported which is housed in the material housing recessed part 242 is made.

FIG. 18 illustrates one example of applying the feeder 30 for pneumatic transporting of the 7th embodiment to the pressure feed type pneumatic transporting apparatus comprising mainly the storage vessel 1, the source of pneumatic force 100 such as the compressor, and the transport pipe 20. The feeder 30 is connected to the exhaust port 1a of the storage vessel 1. The receiving part 303 of powdered or granular materials such as the synthetic resin molding machine and the like is connected by way of the collector 300 to the terminal end side of the transport pipe 20. Between the source of pneumatic force 100 and the feeder 30 the filter 40 and the selector valve 124 are mounted on the gas conduit 36.

A description of the 8th embodiment as shown in FIG. 19 is made as follows: This embodiment and the 7th embodiment are common to each other in terms of the arrangement in which the material housing chamber 223 being formed on the feeder proper 220 is formed at the position eccentric from the material conducting passage 221. Nevertheless, a marked difference between them lies in a forming position of the material outlet 224 and the nozzle 115 and in the construction of the 8th embodiment in which the angle of repose restricting member 240 employs a form of the flat-shapes partition plate.

The arrangement of the 8th embodiment is that while the material outlet 224 and the nozzle 115, opposite to each other, are provided on the center of the material housing chamber 223, the partition plate of adequate shape such as the flat plate is used for the angle of repose restricting member 240, which is movably up and down provided such that its admission depth from the outside of the feeder proper 220 into the material housing chamber 223 or the material conducting passage 221 can be adjusted, and, the straight line defined by combining the straight line between the material outlet 224 and the nozzle 115 and the top end 240a of the angle of repose restricting member 240 with each other being established as a bus, a difference of angle between an angle formed between the afore-mentioned bus and the horizontal line of the bottom of the material outlet 224 and an angle of repose $\theta$ of the material M to be transported is changed by altering an admission depth of the top end 240a of the angle of repose regulating member 240, thereby adjusting the surface of the material M to be transported which forms the angle of repose $\theta$.

If the position of forming the material outlet 224 and the nozzle 115 is arranged to be optionally changeable, a multiplication between such a change and a fluctuated value of the angle of repose restricting member 240 causes the adjustment width of the surface of the material which forms the angle of repose $\theta$ to be considerably extended.

As for the magnitude of the open sectional area S of the material outlet 224 and the magnitude of the injection hole of the nozzle 115, they are optional.

The pneumatic transporting apparatus of the 9th embodiment (FIGS. 20–22), having the feeder 30, which works as the powdered or granular materials floating means 200 in the original transporting place, constituted by a board-shaped article of adequate form such as a circle and a quandrate, comprises the feeder proper 220 in which the material housing chamber 223, formed into the thin-layer-shaped space so that it may be filled with the material M in a thin-layer-shaped manner, is provided, the material outlet 224 being connected to communicate with the transport pipe 20 of smaller diameter on one side (front face side) of the lower part of the material housing chamber 223, and the nozzle 115 being connected to the source of pneumatic force such as the compressor and blower on another side (back face side) opposite to the material outlet 224.

The feeder proper 220 comprises the main body 220a in which the material housing chamber 223 is formed, and the lid 220b covering the main body 220a. 250a is a packing. Thus, the construction of the feeder proper 220 which is divided into the two parts including the main body 220a and the lid 220b brings advantageousness of cleaning easily the material housing chamber 223, being not always sole arrangement so that an integral construction may be also allowed.

The feeder proper 220 (i.e. the material housing chamber 223) is, as shown in FIG. 20, inclined and has the controlling member 20d capable of adjusting the flow of the material which is provided to project from a part of the short transport pipe 20a being equipped by way of the joint 225 with the transport pipe 20, faced to upper place of the material outlet 224 of the material housing chamber 223. Such a construction causes the material M, becoming loose, to be smoothly supplied to the material outlet 224 by the gas. It is desirable to prepare a multiplicity of controlling members 20d whose projecting lengths are different from one another, and if so, an adequate replacement of them can be made in response to the physical properties of the material M. If the material M is of some specified nature, no controlling member 20d is required to be provided. While the feeder proper 220 (material housing chamber 223) takes a perpendicular attitude, the nozzle 115, making an inclined angle to the feeder proper 220 (material housing chamber 223), can be mounted.

A method of supplying the material near to the storage vessel 1 from the upper-stream side of the material housing chamber 223 of the feeder proper 220 thereto is optional, and, in FIG. 20, the supply is illustrated to be made from the short pipe 250 being connected to the storage vessel 1.

The nozzle 115 is detachably threaded into the nozzle inserting hole 252 of the nozzle mounting portion 251 being fixed to the lid 220b of the feeder proper 220. On slightly outer side of the filter 253 being interposed between the top end side of the nozzle 115 and the lid 220b, the injection hole 117 is formed.

A secondary air introducing port 254 is formed in the nozzle mounting portion 251 in a direction of crossing the nozzle inserting hole 252, and the gas being introduced from the secondary air introducing port 254 is supplied by way of the gas guiding passage 255 being formed in the top end of the nozzle 115 into the material housing chamber 223. For this reason, when pressure-transporting the material by the pressure-fed type source of pneumatic force, a closing of the secondary air introducing port 254 with the cočk 256 or a valve preventing a leakage of the compressed gas from taking place, the compressed gas from the source of pneumatic force 100 is fed in from the gas introducing port 257 of the nozzle 115 by way of the injection hole 117 of the nozzle and the filter 253 into the material housing chamber 223. When suction-transporting the material by the suction type source of pneumatic force 100, as shown in FIG. 23 of the 10th embodiment, the necessary arrangement is that after closing the gas introducing hole 257 of the nozzle 115 by the cock 256 or the valve, the secondary air is introduced from the secondary air introducing port 254, and the suction type source of pneumatic force 100 such as the vacuum pump is connected to the side of the transport pipe 20.

Thus, a contrivance of this embodiment lies in possibilities of executing the transportation not only under the pressure-feed system but under the suction system, and if the secondary air introducing port 254 is not primarily formed in the nozzle mounting portion 251, of course, the suction type transportation becomes impossible. A further possibility is that if the nozzle 115, the gas conduit 258 and the pressure-feed type source of pneumatic force 100 are taken away, only the suction transportation can be executed.

FIG. 22 illustrates one example of applying the material feeder 30 for the pneumatic transporting according to the 9th embodiment to the pressure-feed type pneumatic transporting apparatus comprising the storage vessel 1, the pressure-feed type source of pneumatic force 100 such as the compressor, and the transport pipe 20. This material feeder 30 for the pneumatic transporting is mounted to the apparatus by connecting the short pipe 250 to the exhaust port 1a of the storage vessel 1. The receiving part 303 of the powdered or granular materials such as the synthetic resin molding machine and the like is connected by way of the collector 300 to the terminal end side of the transport pipe 20. Element 259 is a damper, which may be allowed not to be provided. Element 260 is the selector valve, and an exhaust filter 306 is connected to the collector 300.

The material feeder 30 for the pneumatic transporting can be applied to other construction excluding such an one as shown in FIG. 22, also applied, of course, to other optional pressure-feed type pneumatic transporting apparatus, and further applied to the suction type pneumatic transporting apparatus.

The 10th embodiment as shown in FIG. 23 is the material feeder 30 which is applied to the suction type pneumatic transporting apparatus, and suction-transports the material M in the material housing chamber 223 from the material outlet 224 by means of the gas suction force from the suction type source of pneumatic force being connected to the terminal end side of the transport pipe. In that case, the gas introducing hole 257 being closed by the cock 256 or the valve, and only the secondary air introducing port 254 being opened, and introduction of the outer air from the secondary air introducing port 254 or a connection between the discharge side of the suction type source of pneumatic force 100 such as the blower or the vacuum pump and the secondary air introducing port 254, made by way of a circulating pipe as shown by an oblique line, causes the discharge gas of the source of pneumatic force 100 to be supplied from the secondary air introducing port 254 or dehumidified gas and hot wind to be supplied from the secondary air introducing port 254, thereby controlling a suction gas quantity of the suction type source of pneumatic force 100 so that a clogging of the material housing chamber 223 with the material may be solved.

An outer air supply to the secondary air introducing port 254 is continuously or intermittently performed at the adequate time when the suction transforming is executed.

It is possible that, in addition to the introduction of the suction gas, the outer air, or the hot wind into the secondary air introducing port 254, the introduction of the compressed gas of the pressure-feed source of pneumatic force 100 from the gas introducing hole 257 loosens or prevents a clogging of the material housing chamber 223 with the material.

FIG. 24 of the 11th embodiment illustrates the material feeder 30 being applied to the pressure-feed type pneumatic transporting apparatus. This embodiment comprises an arrangement in which the nozzle 115 goes out and in from/into the material housing chamber 223, being freely able to make an advance/retreat, thereby changing a position at which the injection hole 117 of the nozzle 115 faces the material housing chamber 223 (material outlet 224) so that it becomes possible that a ratio of mixing between the material M and the gas quantity in vicinity of the material outlet 224 of the material housing chamber 223 is adjusted, a prevention of the clogging with the material being tried to be attained. Element 262 is a positioning screw of the nozzle. Other construction is approximately identical to that of FIG. 20.

FIG. 25 illustrates the construction in which the material is supplied from the material inlet of the feeder proper 220, after the material feeder 30 is inserted into the storage vessel 1, and the material is pressure- or suction-transported to the transport pipe 20 with the pressure-feed or suction type source of pneumatic force 100 used.

The shape of the feeder proper 220 is not always limited to such a disc-shape as shown in the embodiment, and only if its material housing chamber 223 is of the thin-layer-shaped space, it may be allowed to take board-shaped article such as a polygon or an ellipse, other shapes being also optional.

The material housing chamber 223 is used as a metering measure at the same time, and a known level detector (not shown) for detecting a filling quantity of the material can be provided in the material housing chamber 223.

A plurality of the material outlets 224 are formed, and the nozzle 115 ... corresponding to the material outlets 224 ... respectively are provided at the positions opposite to one another, whereby not only the pressure-transporting of the material toward a plurality of destinations but also the suction-transporting thereof toward a plurality of destinations become possible.

Element 270 of FIGS. 20, 22, 23, 24, and 25 is a gas supply pipe which supplies the discharge air of the compressor or the vacuum pump which is used for transporting smoothly the material residual in the transport 20 upon completion of transporting the material in the original transporting place.

Figure 26:
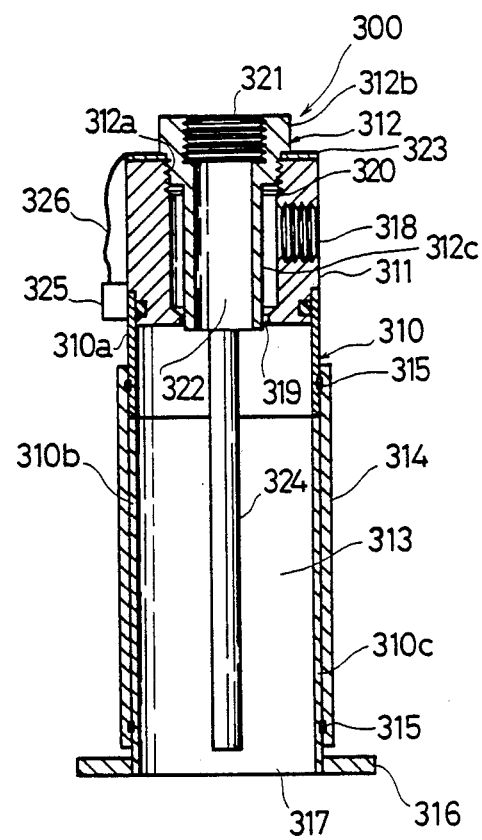
FIG. 26 is a longitudinal sectional view of the collector of the 12th embodiment according to the present invention.
Figure 27:
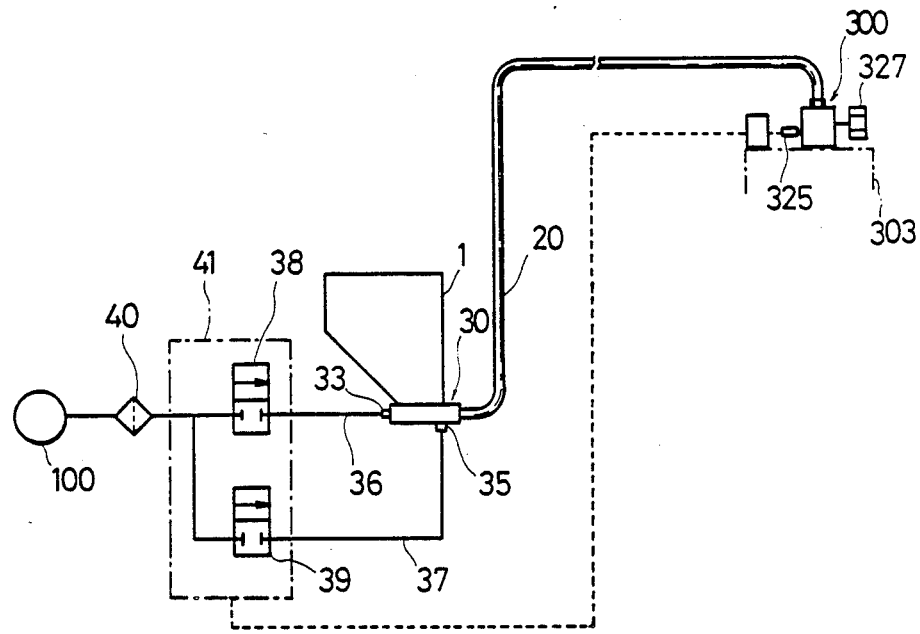
FIG. 27 is an outline of system diagram of an example to which the collector of FIG. 26 is applied.

Next, a description of the embodiments of the collector, located at the transporting destination, which takes out the powdered or granular materials, while separating the powdered or granular materials and the transporting gas from each other, with the transport pipe of smaller diameter used such that the powdered or granular materials do not lodge therein is made in conjunction with FIGS. 26–31 as follows:

A description of FIG. 26 illustrating the 12th embodiment and FIG. 27 illustrating one example to which the embodiment is applied is made as follows:

As shown in FIG. 26, the collector 300 being connected to the outlet of the transport pipe comprises the side wall of the housing chamber 310, the insulated outer lid 311 which is provided on the upper part of the side wall of the housing chamber 310, and the conductive inner lid 312 which is detachably provided in the outer lid 311.

The side wall of the housing chamber 310 has the cylindrical housing chamber 313 for housing the powdered or granular materials formed, the upper cylinder 310a comprising the insulation is formed on the upper part of the housing chamber 313, the lower cylinder has the electrode 310b comprising the conductive material formed, and an inspection hole 310c is formed on a part of the electrode 310b. A cover 314 comprising the transparent material is vertically pressure-fitted by way of 0 rings 315 and 315 between the electrode 310b and the upper cylinder 310a. Although the inspection hole 310c is not always indispensable, it is so convenient that if it is provided, the state of the powdered or granular materials in the collector 300 at the pneumatic transporting can be observed from the outside. The flange 316, which is fixed to the lower part of the side wall of the housing chamber 310 by welding, is mounted to the receiving part 303 of the synthetic resin molding machine by means of bolt-stop. Element 317 is the material outlet which is formed on the lower of the housing chamber 313.

The outer lid 311 has the exhaust hole 318 for the transporting gas and the exhaust passage 319 for the transporting gas formed on its side part and central part respectively, and a male screw 312a of the cylindrical inner lid 312 is detachably threaded into a female screw 320 which is formed in the upper opening of the exhaust passage 319. Thus, taking away of the inner lid 312 from the outer lid 311 enables dust adhering to the inside of the collector 300 to be easily eliminated.

The inner lid 312 comprises the cylinder of larger diameter 312b and the cylinder of smaller diameter 312c and the material inlet 321 and the material passage 322 communicating with the material inlet 321 are integrally formed on the cylinder of larger diameter 312b and the cylinder of smaller diameter 312c respectively. The male screw 312a is formed on the lower part of the cylinder of larger diameter 312b, and this male screw 312a and the female screw 320 are threaded to each other such that a doughnut-shaped terminal plate 323 is interposed between the cylinder of larger diameter 312b and the outer lid 311, thereby facilitating to take away their terminal plate 323 at the cleaning. Since the cylinder of smaller diameter 312c is constructed to has its top end located at the lower part of the exhaust passage 319 under the state of connecting the inner lid 312 to the outer lid 311, the powdered or granular materials which have been pneumatic-transported, the transporting gas, and the dust may be ensured to be separated from one another. Furthermore, throttling of the lower end part of the exhaust passage 319 causes the action of collecting in a separate manner to be executed favorably. The electrode 324 is integrally provided in a perpendicular manner at the eccentric position, which avoids to be in line with the place just under the material passage 322, on the top end of the cylinder of smaller diameter 312c. If this electrode 324 is adequately long enough to have its top end located to become in contact with the setup level (height) of the material (powdered or granular materials), when the collector 300 is assembled, it is satisfactory, and, like this embodiment, if the electrode 324 is constructed to be long enough to reach the place near the lower end of the housing chamber 313, in addition to the setup level, a continuous detection of the level becomes possible.

The inner lid 312 is electrically connected in a conductive manner to a detecting part 325 by a lead wire 326, and the detecting part 325 is conductively connected also to the electrode 310b in the side wall of housing chamber 310.

An appliance capable of detecting electrostatic capacity such as a Q meter is disposed in the detecting part 325. In FIG. 26 the detecting part 325 is provided on the side wall of the collector 300, and an alternative lies in separate provision of them with a long lead wire used.

In order that the transporting gas which is separated in the collector 300 is discharged to the outside of the system under the state of being clean, as shown in FIG. 27, the exhaust filter 327 is connected to the exhaust hole 318. In that case, a circulating circuit is also possible in which the exhaust filter 327 and the source of pneumatic force 100 as shown in FIG. 27 are connected by way of a piping to each other.

A description of one example to which the collector 300 of such a construction as shown in FIG. 26 is applied is made in conjunction with FIG. 27 in which the same pneumatic transporting apparatus as that of FIG. 6 is provided as follows:

The source of pneumatic force 100 and the feeder 30 are connected to each other by the gas conduit 36, and the control box 41 in which the selector valve 38 such as a solenoid valve is packaged is provided in the adequate place of the gas conduit 36. The detecting part 325 is, as shown by a dotted line in FIG. 27, connected to the control box 41 and the control box 41 enables a collecting quantity of powdered or granular materials by the collector to be controlled. If the powdered or granular materials are supplied up to the setup level in the collector 300, for example, an action by both the electrodes 310b and 324 causes the detecting part 325 to detect the setup level and a signal to be sent to the control box 41, and the selector valve is closed, thereby stopping the transportation of the powdered or granular materials. In FIG. 27, in vicinity of the outlet of the feeder 30, the branch gas conduit 37 is disposed, the selector valve 39 such as the solenoid valve being also provided, and such a line allows the compressed gas to be supplied so that a clogging of the pipe with the powdered or granular materials at the stop of transportation may be prevented. The same symbols in FIG. 27 as those in FIG. 6 stand for the same constructions.

The shape of the feeder 30 is optional, and, in this embodiment, such a construction as shown in FIG. 3 is employed.

Figure 28:
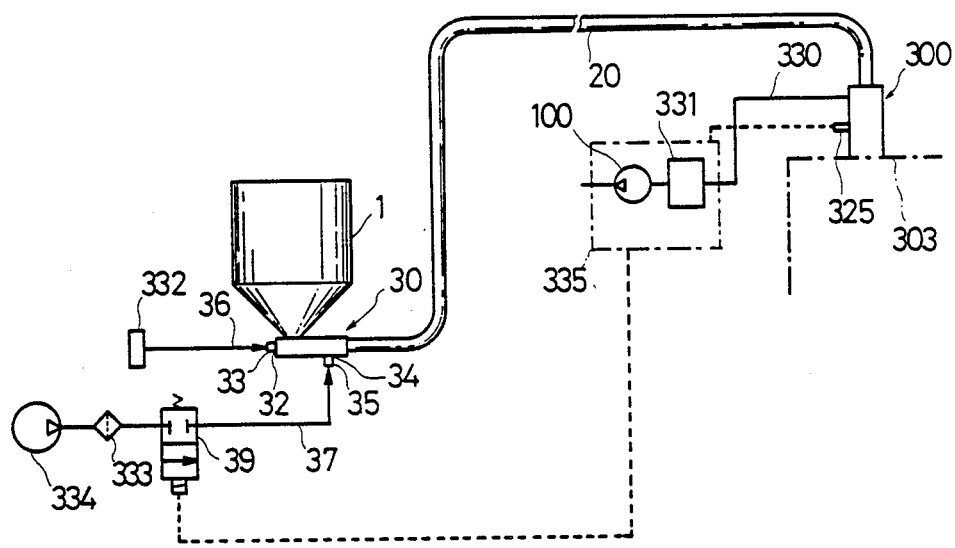
FIG. 28 is an outline of system diagram of other example to which the collector of FIG. 26 is applied.

The system of FIG. 28, which illustrates other example to which the collector 300 of FIG. 26 is applied, is applied to the suction type pneumatic transporting apparatus.

Namely, similarly to FIG. 27, the collector 300 wherein a connection among the storage vessel 1, the feeder 30, the transport pipe 20 of smaller diameter, the collector 300, and the receiving part 303 of the powdered or granular materials is continuously made is equipped by way of the suction gas conduit 330 and the filter 331 with the suction type source of pneumatic force 100 such as the vacuum pump, and a suction action by the source of pneumatic force 100 causes the material in the storage vessel 1 to be suction-transported by way of the feeder 30, the transport pipe 20, and the collector 300 to the receiving part 303. The gas conduit 36 is connected by way of a joint 33 to the 1st gas conducting hole 32 of the feeder 30 of such a construction as shown in FIG. 3 not such a source of pneumatic force as shown in FIG. 27 but the filter 332 is provided on the top end of the gas conduit 36, and the secondary gas such as outside air is taken in from the side of the filter 332 through the gas conduit 36, the joint 33, and the 1st gas conducting hole 32 into the transport passage. The source of pneumatic force 334 such as the compressor is connected by way of the joint 35, the branch gas conduit 37, the selector valve 39, and the filter 333 to the 2nd gas conducting hole 34 of the feeder 30, and the compressed gas from the source of pneumatic force 334 is intermittently supplied by way of the filter 333, the joint 27, and the 2nd gas conducting hole 34 to the transport passage, whereby a clogging of the material transport passage of the feeder 30 and the transport pipe 20 with the material is solved. In the case of the material which does not lodge, of course, there is no necessity of supplying the compressed gas from the 2nd gas conducting hole 34, and in the aforementioned situation, the intermittent supply of the compressed gas is made, a continuous one is also possible.

A switch (not shown) being mounted to the control part 335 allows an ON/OFF operation of the source of pneumatic force 100, the detecting part 325, and the selector valve 39 to be performed.

A construction may be put into practice in which the exhaust port of the source of pneumatic force 100 is connected to the selector valve 39, and the source of pneumatic force 334 and the filter 333 are not mounted.

In this embodiment, the electrode 310b constitutes partially the side wall of the housing chamber 310, and it may also occupy entirely the same, its length being optional.

As mentioned above, when the housing chamber 313 of the collector 300 is filled with the setup level of powdered or granular materials, a change in electrostatic capacity of the electrode 324 causes the detecting part 325 to detect the setup level, and a signal to be sent to the control part 335, thereby stopping the transportation of the powdered or granular materials.

Figure 29:
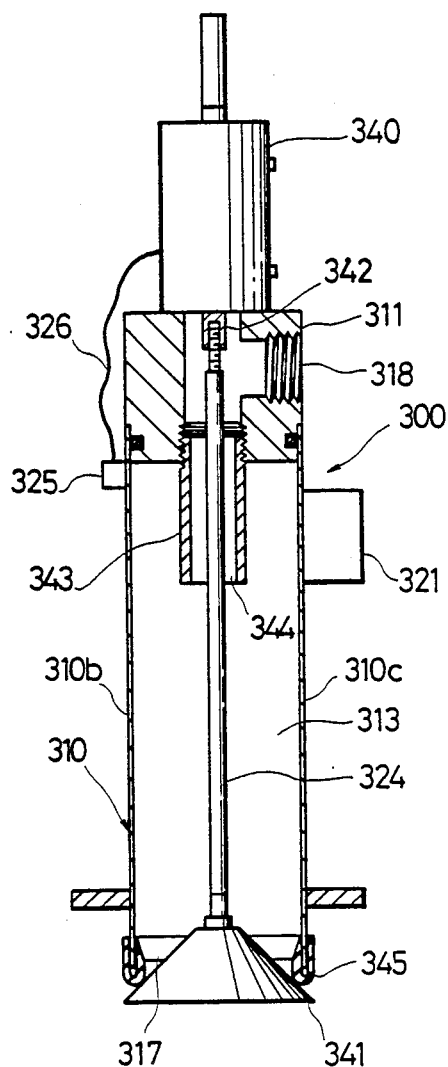
FIG. 29 is a longitudinal sectional view of the collector of the 13th embodiment according to the present invention.

The 13th embodiment as shown in FIG. 29 is characterized in that while the electrode 324 provided in the housing chamber 313 of the collector 300 is connected to a vertically moving member 340, such as a fluid pressure cylinder, which is provided in the outer lid 311 on the upper part of the side wall of housing chamber 310, a vertical movement of a valve unit 341, mounted to the top end of the electrode 324, enables the material outlet 317 of the housing chamber 313 to be opened and closed, and the exhaust hole 318 is formed in the outer lid 311, the material inlet 321 being formed on the side wall of the housing chamber 310.

The lower end part of a rod 342 of the vertically moving member 340 and the upper end part of the electrode 324 are connected to each other, a cylinder 343 into which the electrode 324 is inserted is threaded to be provided perpendicularly on the lower part of the outer lid 311, and a contrivance lies in an arrangement in which a location of the lower end of the cylinder 343 under the material inlet 321 may prevent the electrode 324 corresponding to the material inlet 321 from being given a damage by the material to be transported. The hollow part of the cylinder 343 communicates with the exhaust hole 318. Element 345 is the packing. The pressure-feed or suction type source of pneumatic force (not shown) is connected to the exhaust hole 318, and the transport pipe is connected to the material inlet 321. The same symbols of FIG. 29 as those of FIG. 26 stand for the same constructions.

Figure 30:
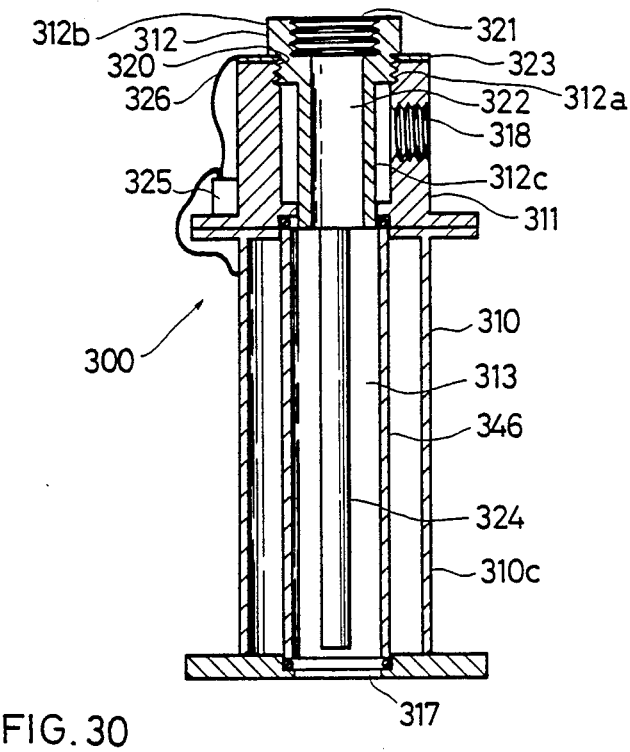
FIG. 30 is a longitudinal sectional view of the collector of the 14th embodiment according to the present invention.

The 14th embodiment as shown in FIG. 30 has the housing chamber 313, and is characterized in a double inner and outer container structure in which the insulated inner cylinder 346, made of the transparent material such as glass, is packaged in the side wall of the housing chamber 310, its other construction being approximately identical to that of FIG. 26.

Although such a construction as shown in FIG. 26 in which the housing chamber 313 is formed directly in the side wall of the housing chamber 310, and the inspection hole 310c is formed in the side wall of the housing chamber 310 causes the inspection hole 310c to give rise to a difference in level on the inner side of the housing chamber 313, whereby the residual material inconveniently takes place, the construction of FIG. 30 can solve such an inconvenience. The same symbols of FIG. 30 as those of FIG. 26 stand for the same constructions.

Figure 31:
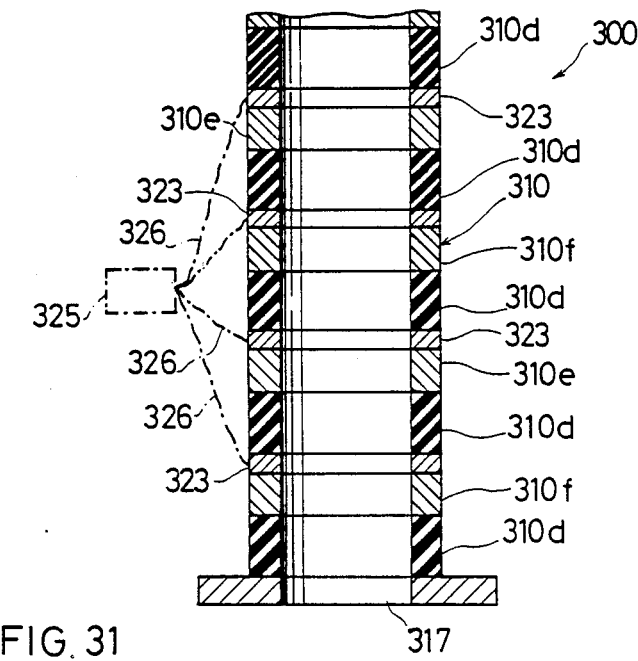
FIG. 31 is a longitudinal sectional view of the collector of the 15th embodiment according to the present invention.

The 15th embodiment as shown in FIG. 31 comprises an arrangement in which the side wall of the housing chamber 310 has one unit or plurality units of electrodes 310e and 310f, differently opposite to one another, overlaid upon one another with the insulated parts 310d interposed between them, such an electrode 324 as shown in FIGS. 26, 29, and 30 being not provided, and the terminal plates 323 are put on the electrodes 310e and 310f, and, under such an arrangement, when the material with which the chamber is filled reaches a positional height of the desired insulated part 310d, a corresponding change in electrostatic capacity of the electrodes 310e and 310f which are vertically disposed to interpose the insulated part 310d there between causes the detecting part to detect the setup level. A proper change in the connecting system of the electrodes 310e and 310f with a power source and their positions may be allowed. The same symbols of FIG. 31 as those of FIG. 26 stand for the same constructions.

An arrangement in which there is only one unit of the insulated part 310d and both the electrodes 310e and 310f is accepted, and a possible alternative is, as shown in FIG. 31, that a plurality of units are overlaid upon one another.

Such a construction not only is very simple, because it is possible to form the positive and negative electrodes only on the side wall of the housing chamber 310, but also, in the case where the electrode 324 is packaged in the chamber 313, solves a defect in which a change in physical properties of the material to be transported, such as its damage, takes place, when it hits against the electrode 324.

The positional height of the electrodes 310b and 324 is optional. The shape and the structure of the collector 300 are not always limited to the illustrated ones and they may be changed to other modes, their proper change being allowed. For example, the material outlet 317 being not formed, the collector 300, being closed, can be formed into a vesseled shape.

If the outer lid 311 is detachably provided on the side wall of the housing chamber 310, it is convenient at the cleaning of the outer lid 311.

Figure 32:
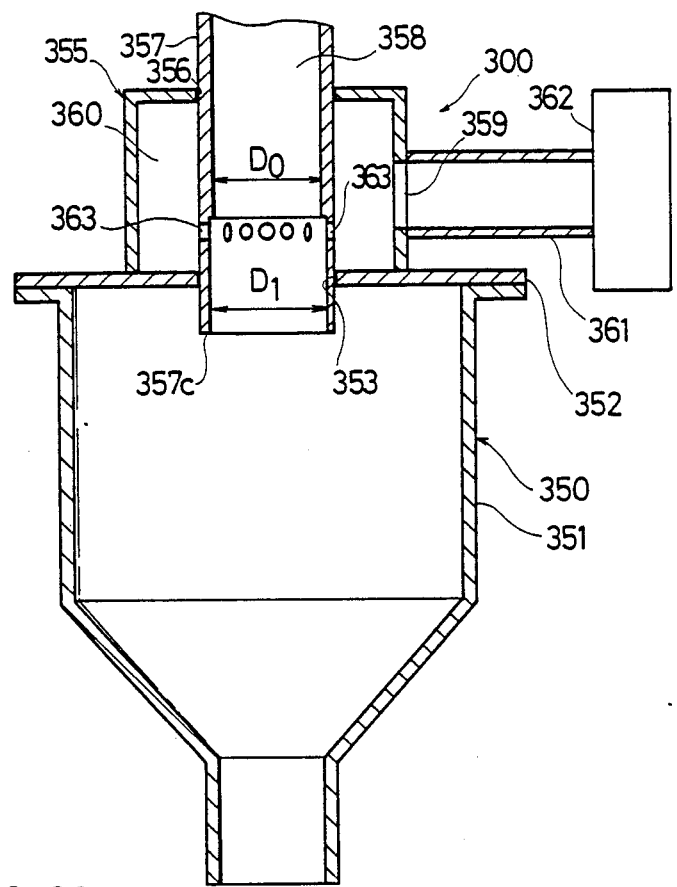
FIG. 32 is a longitudinal sectional view of the collector of the 16th embodiment according to the present invention.

A description of the 16th embodiment as shown in FIG. 32 is made as follows:

The collector 300 comprises the collector proper 350 for collecting the powdered or granular materials and the separator 355, disposed on the upper-stream side of the collector proper 350, which separates the powdered or granular materials, the transporting gas, and the dust from one another.

The collector proper 350 consists of the main body 351 and the lid 352, and the opening 353 is formed on the lid 352. The separator 355, having a void chamber 360 located at its inside, takes a box-shape whose lower part is opened, and is put under the lid 352 of the separator proper 350. A transport pipe inserting hole 356 is formed in the center of the upper plate of the separator 355, the transport pipe 357 having the powdered or granular passage 358 through which the powdered or granular materials are transported together with the gas is inserted into the transport inserting hole 356, and the lower end part of the transport pipe 357, being inserted into the opening 353, faces the inside of the collector proper 350. The exhaust hole 359 for discharging the powdered or granular materials, and the separated transporting gas or dust to the outside of the separator 356 is formed in the adequate place of the outer wall of the separator 355, and the exhaust hole 359 is equipped by way of the piping with the known filter 362.

Figure 33:
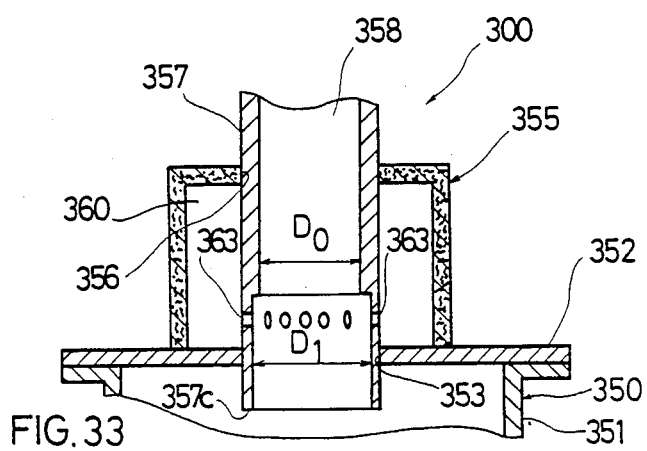
FIG. 33 is a longitudinal sectional view of the separator whose exhaust hole is, as a modified example, illustrated to be formed out of the permeable material.

As shown in FIG. 33, it is possible that the exhaust hole 359 has the outer wall of the separator 355 formed out of the permeable material.

The gas conducting passage 363, comprising a multiplicity of small holes, which can face the inside of the void chamber 360 of the separator 355, is formed in the transport pipe 357. The gas conducting passage 363 causes the transporting gas or dust mixed in the powdered or granular materials which is supplied from the powdered or granular materials passage 358 of the transport pipe 357 to be taken out into the void chamber 360 of the separator 355, and such a gas or dust is discharged by way of the exhaust hole 359 to the outside of the system.

Figure 34:
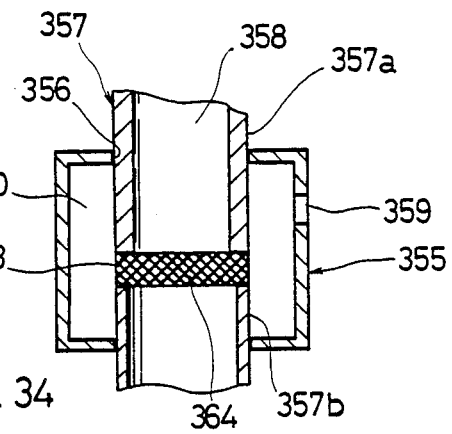
FIGS. 34, 35, and 36 are longitudinal sectional views respectively of modified examples of the gas conducting passage.
Figure 35:
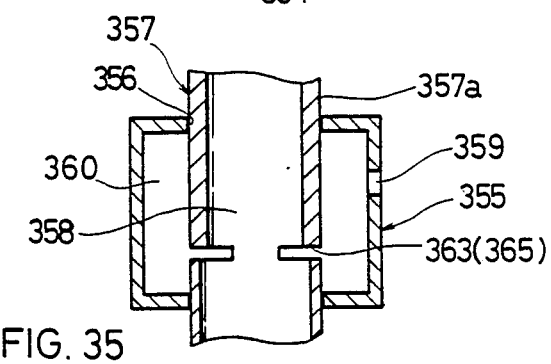
Figure 36:
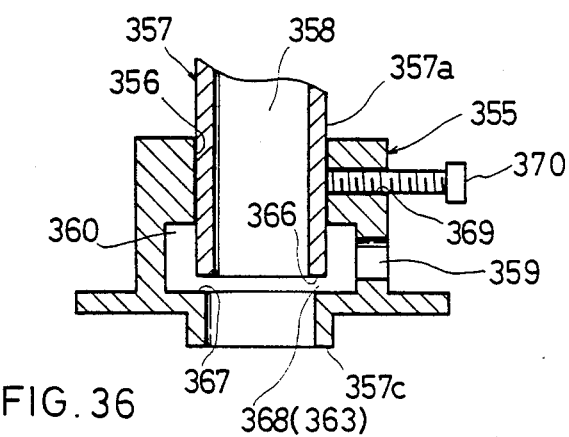

The gas conducting passage 363 is, as shown in FIG. 34, allowed to have the upper transport pipe 357a and the lower transport pipe 357b which are divided connected to each other by the permeable material such as net, punching metal and the like, or, as shown in FIG. 35, to be formed of notches 365 of adequate peripheral length instead of such a multiplicity of small holes as shown in FIG. 32, or, as shown in FIG. 36, to be replaced by slits 368 which are made between the lower end margin of the transport pipe 357 being inserted into the separator 355 and the upper opening margin 367 of the material outlet of the separator 355, other proper change in design thereof being also accepted.

In the case of such a construction as shown in FIG. 36, it is more recommendable that a structure in which a bolt 370 is inserted into a bolt hole 369 made in the outer wall of the separator 355, and supports the side part of the transport pipe 357 permits the transport pipe 357 to be vertically moved, thereby changing the flow sectional area of the slit 368 (i.e. the gas conducting passage 363).

A position of forming the gas conducting passage 363, which may be optionally changeable, as shown in FIG. 32, is preferably located at a position being nearer to the upper-stream side from the lower end part 357c of the transport pipe 357 by the same length as the bore $D_1$ of the powdered or granular materials passage 358.

The bore of the powdered or granular materials passage 358 of the transport pipe 357 which is inserted into the separator 355 makes preferably the bore $D_1$ on the lower-stream side by identical or slightly larger to/than the bore $D_0$ on the upper-stream side ($D_1 \geq D_0$) at the front and back parts of the gas conducting passage 363.

Figure 37:
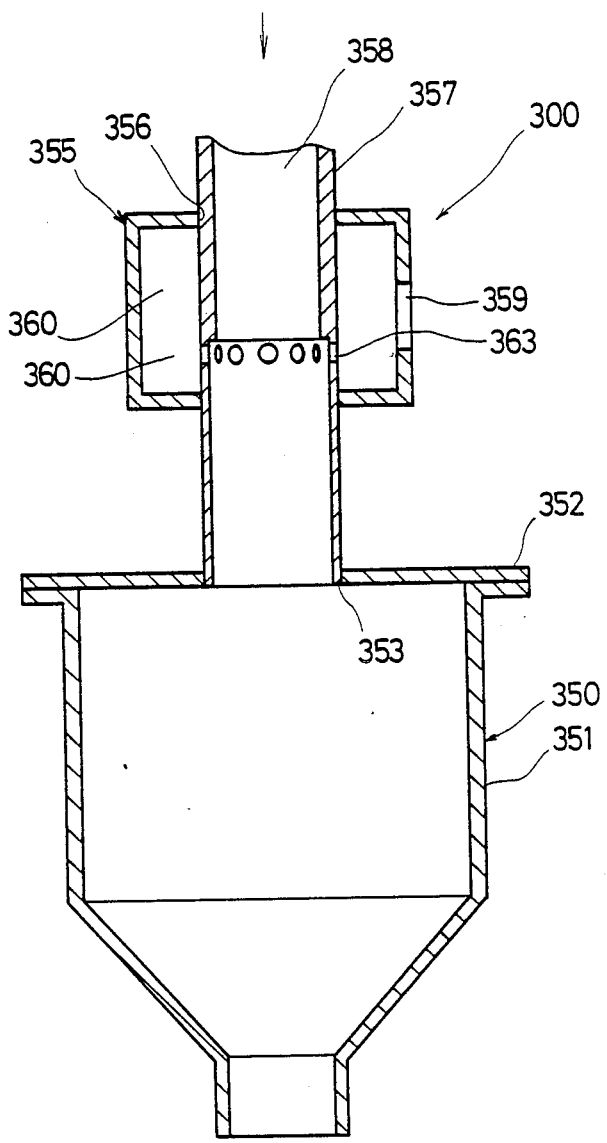
FIG. 37 is a longitudinal sectional view of a state where the separator is connected by way of the transport pipe to the collector proper.

The separator 355 may be, as shown in FIG. 32, connected directly to the separator proper 350, or both the elements 355 and 350 may be integrally formed as one unit. A further alternative may be, as shown in FIG. 37, that the separator 355 being detached from the separator proper 350, the lower end part of the transport pipe 357 is constructed to be connected to the separator proper 350 (lid 352).

A description of the 17th embodiment is made in conjunction with FIG. 38 as follows:

The collector 300 comprises the collector proper 350 for collecting the powdered or granular materials and the separator 355 which is disposed on the upper-stream side of the collector 350. In this embodiment, the lid 352 and the bottom lid 373 are mounted by way of the packings 374 and 375 to the upper and lower parts respectively of the collector proper 350, and a formation integral with the main body 351 without mounting the lid 352 and the bottom lid 373 thereto may be also allowed. The separator 355 is fixed by way of the packing 376 to the lid 352.

The separator 355, approximately cylindrical, has the transport pipe inserting hole 377 located at its center. The short transport pipe 378, partially constituting the transport pipe, is fitted into the lower part of the transport pipe inserting hole 377, the transport pipe 357 which is constructed to form the slit-shaped gas conducting passage 363 between the upper face of the short transport pipe and it is inserted into the transport pipe inserting hole 377, and the side part of the transport pipe 357 is fixed by a bolt 381 which is inserted into the bolt inserting hole 380 formed in the upper face of the separator 355. The transport pipe 357 and the short transport pipe 378 communicate with the inside of the collector 350. 382 is the packing.

The mounting part of the exhaust hole 359a is provided in the outer wall of the separator 355, the exhaust pipe 371 having the exhaust hole 359 is connected to the mounting part of the exhaust hole 359a, and the gas supply pipe 372 for supplying the gas for cleaning the gas conducting passage 363 to the exhaust pipe 371. An intermittent or continuous injection-supply of the gas such as the air and the inactive nitrogen from the injection hole of the gas 372a of the gas supply pipe 372 permits the gas conducting passage 363 to be cleaned, and, when the cleaning is not performed, the separated gas or dust is discharged from the top end of the exhaust hole 359 to the outside of the separator 355.

The gas supply pipe is provided on the collector proper 350, the gas from the gas supply pipe cleans the inside of the collector proper 350, and the exhaust gas is discharged from the exhaust hole 359 of the collector 355 to the outside of the system. Namely, the upper gas supply pipe 383 and the lower gas supply pipe 384 are provided on the lid 352 of the collector proper 350 and the bottom lid 373 thereof respectively, the gas is supplied from the upper gas supply pipe 383 to the lower-stream side of the inside of the collector proper 350 in order to brush off the dust, and it, becoming the ascending gas, is discharged from the exhaust hole 359 to the outside of the system, while the gas from the lower gas supply pipe 384 is supplied from the lower part of the inside of the collector proper 350 to the upper part thereof so that it is discharged from the exhaust hole 359 to the outside of the system. In that case the gas is intermittently or continuously supplied. Only one of the upper gas supply pipe 383 and the lower gas supply pipe 384 can be also mounted.

Figure 38:
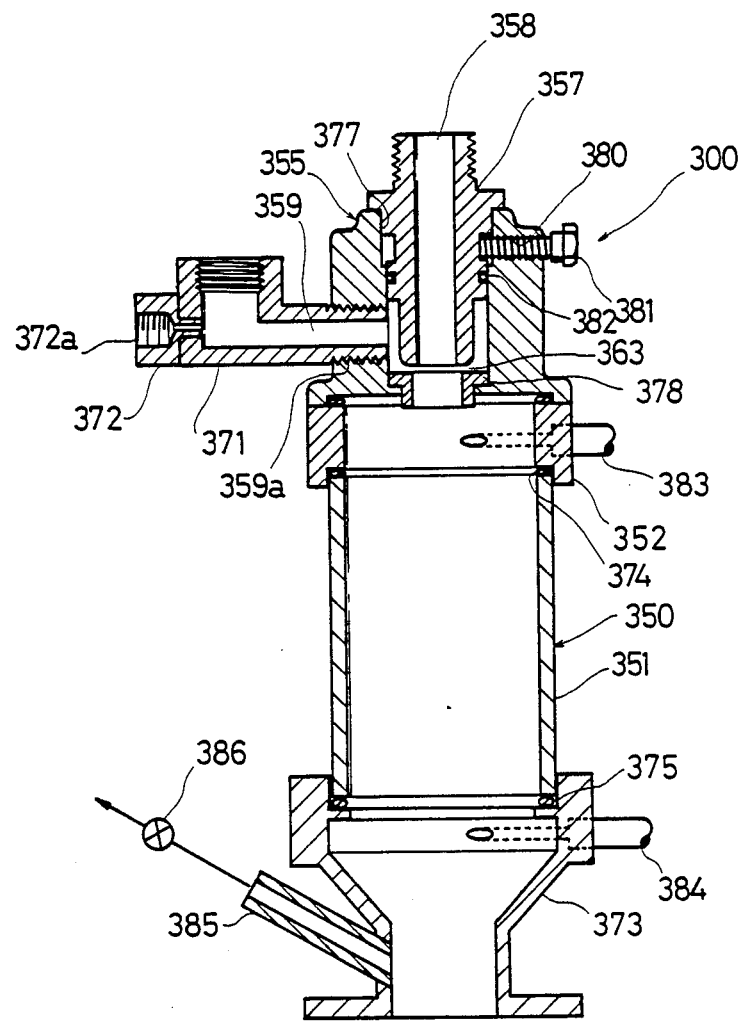
FIG. 38 is a longitudinal sectional view of the collector of the 17th embodiment according to the present invention.

In FIG. 38, when cleaning the gas conducting passage 363 and the collector proper 350, the exhaust pipe 385 mounted to the bottom lid 373 is opened by way of the valve 386, thereby issuing the back pressure gas, while when the cleaning is not performed, the exhaust pipe 385 is closed by way of the valve 386.

Figure 39:
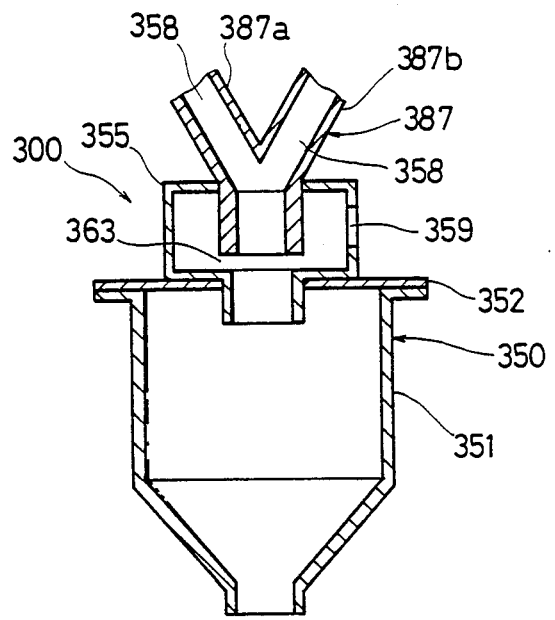
FIGS. 39 and 40 are longitudinal sectional views of modified example respectively of the transport pipe.
Figure 40:
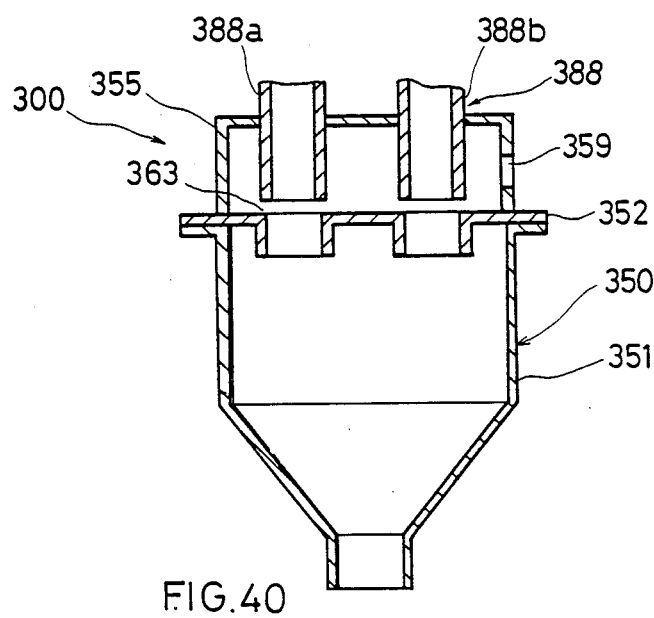

The transport pipe which is inserted into the separator 355 is, as shown in FIGS. 39 and 40, formed, and the powdered or granular materials can be supplied from over two units of the transport pipes. The transport pipe of FIG. 39, Y-shaped, makes the branch pipes 387a and 387b located on the upper-stream side join one unit of the transport pipe 387c at the lower place, and the transport pipe 388 of FIG. 40 consists of over two units of transport pipes 388a, 388b . . . (e.g. two unit of pipes in the drawing), the proper change in the design thereof being also allowed.

Figure 41:
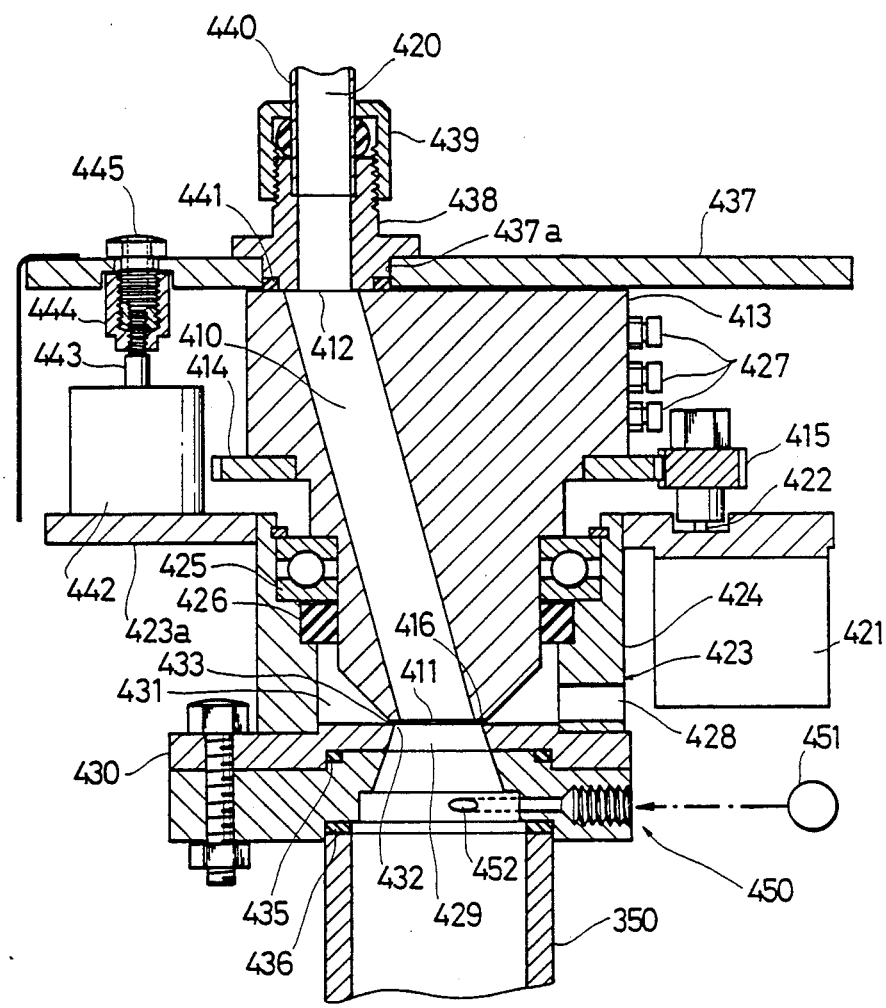
FIG. 41 is a longitudinal sectional view of the collector of the 18th embodiment according to the present invention.
Figure 42:
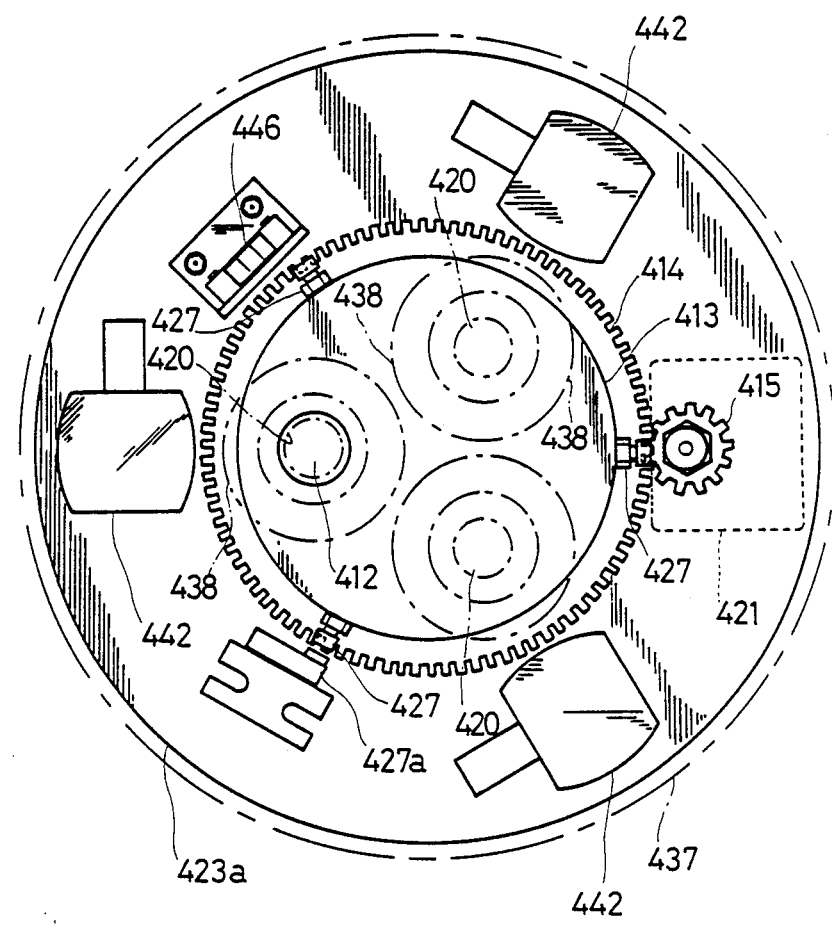
FIG. 42 is a plan view of a state where the partition plate of FIG. 41 is taken off.

FIGS. 41 and 42 illustrate the 18th embodiment. This embodiment comprises one unit of rotatable transport pipe 410, and a plurality of material select passages 420 capable of communicating with the transport pipe 410 (e.g. three units are specified for example purpose in the embodiment, any option being allowed.) Its characteristics lie in the arrangement in which the transport pipe 410 is rotated to communicate with the fixed material select passage 420, thereby making automatically a selective change-over of the material select passage 420.

Namely, as shown in FIG. 41, the transport pipe 410, being inclined, has the lower end discharge port 411 provided at its rotational center position, and a rotation of the transport pipe 410 enables a positional change of the upper end supply port to be made toward the circular locus.

In this embodiment, as a means of rotating the transport pipe 410, a large gear 414 is fixed to the body part 413 of the transport pipe 410, and a small gear 415 in mesh with the large gear 414 is provided. A motor 421 whose drive shaft 422 is connected to the small gear 415 is provided, whereby a drive of the motor 421 causes the transport pipe 410 to be rotated by way of the large gear 414, and the small gear 415.

A bearing 225 is interposed between the lower part of the body 413 of the transport pipe 410 and the side wall 424 of the separator 423. The rotating means of the transport pipe 410 is not always limited to the afore-mentioned gear mechanism, a belt mechanism and the like being allowed.

The positional detecting sensors 427 and 427a are constructed to position the rotational position of the transport pipe 410 every the material select passage 420, . . . Namely, the positional detecting sensors 427 and 427a detect the predetermined position of rotational angle of the transport pipe 410, thereby connecting the transport pipe 410 to communicate properly with the desired one of a plurality of material select passages 420. 446 is a sensor for confirming a state of separating the transport pipe 410 and the selector plate 437 from each other.

The separator 423 comprises the side wall 424 in the portion of which the exhaust hole 428 is made, and the bottom plate 430 on which the material introducing passage 429 is formed, and the part surrounded by the side wall 424 and the bottom plate 430 is defined as a void chamber 431 for separating the material, the transporting gas, and the dust from one another. The discharge port 411 of the transport pipe 410 faces the inside of void chamber 431, and an annular and small slit 433 is formed between the lower end peripheral margin 416 of the transport pipe 411 and the upper end peripheral margin 432 of the material introducing passage 429.

Elements 426, 435, and 436 are sealing members.

A plurality of material select passages 420 . . . (e.g. three units in this embodiment) are provided to be spaced equally on the selector plate 437.

The material select passages comprise the connecting transport pipe 438 connected to communicate with the selector plate 437, and the transport pipe 440 fixed to the connecting transport pipe 438 by the fastening member 439 such as the nuts. The sealing material 441 is interposed between the communicating hole 437a of the connecting transport pipe 438 of the selector plate 437 and the connecting transport pipe 438.

The piston rod 443 of the fluid pressure cylinder 442 fixed to the horizontal plate 423a located at the one and upper side 423 is fixed by way of the adjusting member 444 to the selector plate 437 by the fastening member 445 such as the nuts. When rotating the transport pipe 410 to change over the material select passage 420, the piston rod 443, whose work is started by an actuation of the fluid pressure cylinder 442, causes the selector plate 437 to be moved up to separate the selector plate 437 from the transport pipe 410, and after positioning the transport pipe 410 to the desired material select passage 420, the selector plate is by way of the piston rod 443 moved down, thereby connecting the transport pipe 410 to communicate with the desired material select passage 420. An adjustment of a height of pushing up the selector plate 437 is performed by adjusting a positional height of moving up the adjusting member 444. The change-over means of the selector plate 437 is not always limited to the afore-mentioned construction, a proper change in design thereof being allowed.

The apparatus according to this embodiment has a self-cleaning mechanism 450 provided between the bottom plate 430 and the collector proper 350, and the self-cleaning mechanism 450, being actuated during the running or prior to the change-over of the material, is designed to supply the gas from the source of pneumatic force 451 from the injection hole 452 to the inlet side of the collector 350.

An injection of the gas gives rise to the cyclone action, and its centrifugal force permits the material and dust adhering to the collector proper to be separated from the collector proper. Namely, while the material falls down to the inside of the collector 350, the gas and dust used for self-cleaning are discharged by way of the annular slit 433 from the exhaust hole 428.

In the 18th embodiment, such a self-cleaning mechanism as shown in FIG. 38 may be designed.

As the construction of changing over the transport pipe to multiple directions, in addition to the afore-mentioned embodiment, various kinds of designs can be thought as shown in FIGS. 43–46, other constructions being able to be adopted.

Figure 43:
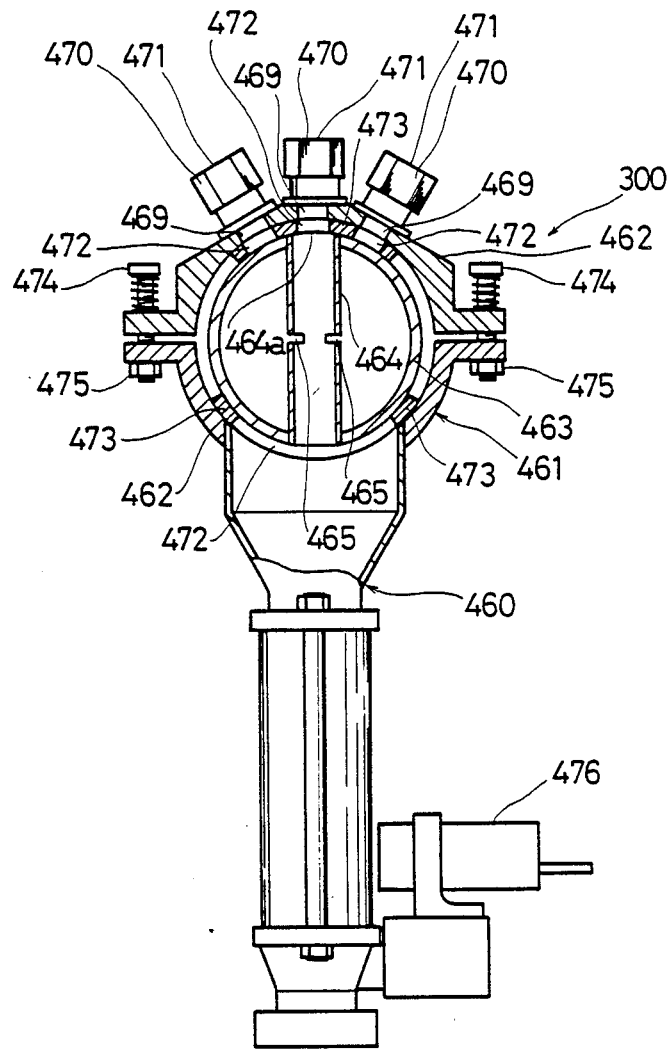
FIG. 43 is a longitudinal sectional view of the vicinity of the collector of the 19th embodiment according to the present invention.
Figure 44:
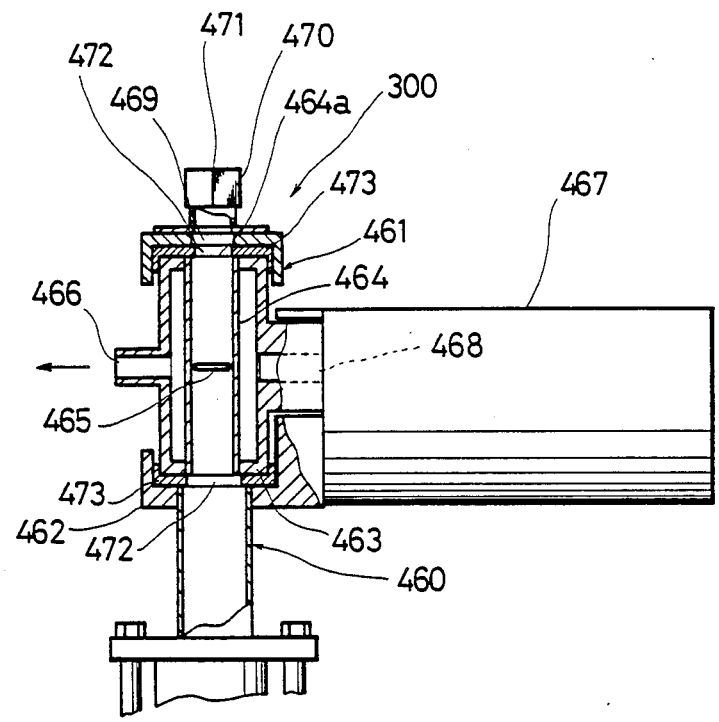
FIG. 44 is a partial longitudinal sectional view taken from the right side face of FIG. 43.

A description of FIGS. 43 and 44 illustrating the 19th embodiment is made as follows: The collector 300 comprises the collector proper 460 and the separator 461 which is disposed on the upper-stream side of the collector proper 460. In the separator 461 a casing 462 and a disc-shaped rotor 463 which is rotated to and for in the casing 462 are formed, the transport pipe 464 acting as the transport passage penetrates the diametral direction of the rotor 463, and the material inlet 464a and the gas conducting passage 465 are formed on the upper and middle parts respectively of the transport pipe 464. The gas conducting passage 465 communicates with the exhaust hole 466 made in the outer wall of the rotor 463. As shown in FIG. 44, the rotor 463 is connected to the drive shaft 468 of the motor 467, and a drive of the motor 467 enables the rotor 463 to be automatically rotated. Instead of the motor 467, it is possible that a manual operation of the lever handle (not shown) connected to the rotor 463 rotates to and for the rotor 463 in a manual manner.

A plurality of material conducting passages 469 . . . are formed on the external peripheral surface of the casing 462 with the predetermined intervals left, the connecting transport pipe 470 through which the powdered or granular materials passage 471 is formed is connected to communicate with the outside of each of the material conducting passages 469. A seal 473 having at least a part opposite to each of the material conducting holes 469 and the material communicating hole 472 equal to an amount of rotational distance between 1st material conducting hole 469 and the last one is interposed between the casing 462 and the rotor 463.

In such a state as shown in FIGS. 43 and 44, a drive of the motor 467 or the lever handle (not shown) in a fixed direction or positive and negative directions causes the transport pipe 464 to communicate with material conducting hole 469 of the other different connecting transport pipe 470, thereby making it possible to change over the transport pipe in a different mode.

Element 474 is a bolt, element 475 is a nut, and element 476 is a known level instrument for detecting the filling level of the powdered or granular materials.

Figure 45:
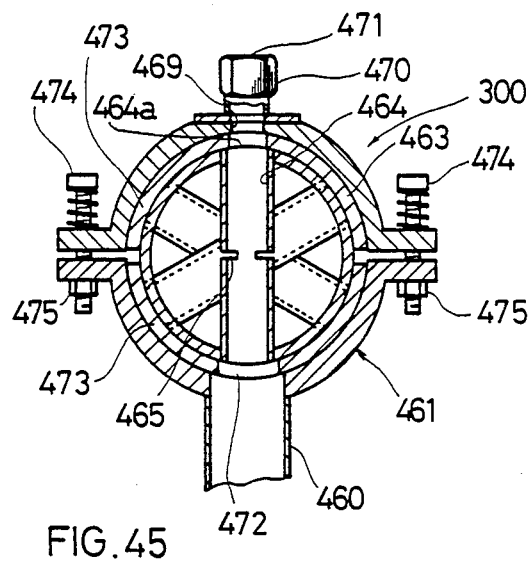
FIG. 45 is a longitudinal sectional view of the collector of the 20th embodiment according to the present invention.
Figure 46:
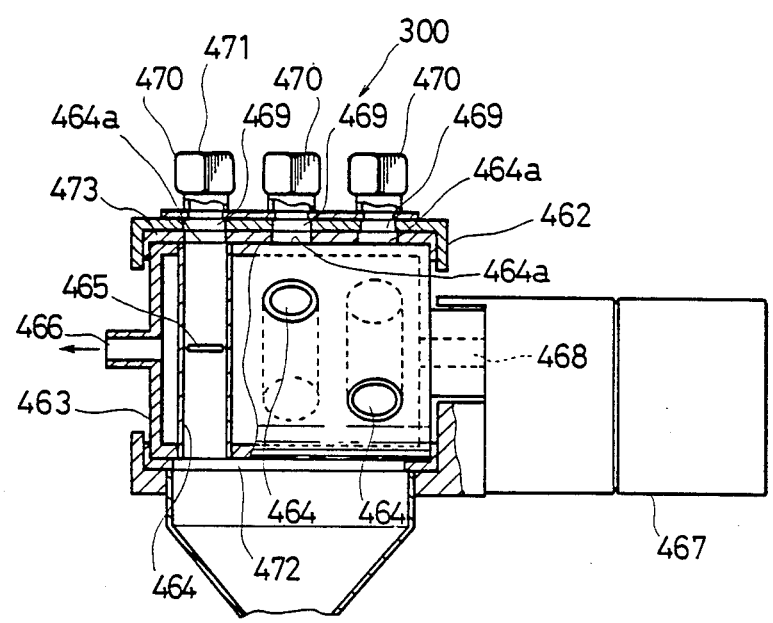
FIG. 46 is a partial longitudinal sectional view taken from the right side face of FIG. 45.

A description of FIGS. 45 and 46 illustrating the 20th embodiment is made as follows: This arrangement is an modified example of the 19th embodiment (FIGS. 43 and 44), in which the external peripheral surface side of the rotor 463 is extended, a plurality of transport pipes 464 (e.g. three units in the drawing, two units or over four units being accepted) are provided such that they are spaced equally at the diametral position of the external peripheral surface of the rotor 463, their material inlet 464a being dislocated in a circumferential direction, and a rotation of the rotor 463, made a fixed angle by a fixed angle, causes the transport pipe 464 to communicate with the powdered or granular passage 471 of the connecting transport pipe 470, whereby a changeover to a different transport pipe can be made. The same symbols of FIGS. 45 and 46 as those of FIGS. 43 and 44 stand for the same constructions.

The apparatus according to the 16th–20th embodiments does not employ the conventional arrangement in which the filter is used for the separate collection, and for this reason, while the material falls to be collected in the collector proper under the state where it is separated from the transporting gas and the dust by means of the air flow of the transporting gas and the inertia force of the material, and as a result of discharge of the dust together with the transporting gas from the gas conducting passage, a smooth separated collection can be executed without a clogging of the collector proper and the separator and a residual adhering of the material thereto.

Even if a clogging with the dust or an adhering residue of the material takes place in the gas conducting passage, they can be easily brushed off by means of the air flow of the transporting gas and the inertia force caused by the dead load of the material. In addition, the large-sized apparatus such as the cyclone unit, which has been conventionally needed, becoming unnecessary, the simple construction meets the requirement in which the necessity only lies in forming the annular slit in the void chamber, the apparatus, as a whole, can be miniaturized, and the installing space is markedly reduced.

As the method of pneumatic-transporting the material, a limit to such suction and pressure-feed types as shown by the embodiments is not always absolute, a proper change in design toward other modes being able to be put in practice.

We claim:

1. A method for transporting powdered or granular materials by pneumatic force with a transport pipe of small diameter relative to particle size, in use for an apparatus for transporting powdered or granular materials by the pneumatic power wherein the powdered or granular materials in a storage vessel are transported through the transport pipe to a destination by the pneumatic force from a pneumatic force source, characterized in that the transport pipe of smaller diameter, having a bore 2–6 times as long as maximum length of particle of the powdered or granular materials to be transported, is used, and the powdered or granular materials, being kept to float at an inlet or in the vicinity of the inlet of transport pipe, are transported through the transport pipe.

2. An apparatus for transporting powdered or granular materials by pneumatic force with a transport pipe of smaller diameter relative to particle size comprising:
   a storage vessel;
   a transport pipe of smaller diameter, having a bore 2–6 times as long as maximum length of particle of powdered or granular materials to be transported, which communicates with a materials outlet of the storage vessel;
   a pneumatic force source for transporting the powdered or granular materials in the storage vessel by way of the transport pipe to a destination; and
   a powdered or granular materials floating means of transporting the powdered or granular materials by the pneumatic force from the transport pipe to a destination in such a manner that the powdered or granular materials do not lodge in the transport pipe, while the powdered or granular materials are kept to float at an inlet or in the vicinity of the inlet of the transport pipe.

3. An apparatus for transporting powdered or granular materials by pneumatic force with a transport pipe of smaller diameter relative to particle size, as defined in claim 2, wherein the transport pipe is formed from the same material as that for the powdered or granular materials to be transported.

4. An apparatus for transporting powdered or granular materials by pneumatic force with a transport pipe of smaller diameter relative to particle size, as defined in claim 2, wherein suction port of vacuum pump as a pneumatic force source is connected to an exhaust port of a collector being connected to an outlet end of the transport pipe, a port for supplying gas for floating the powdered or granular materials, a means of floating the powdered or granular materials, is formed in vicinity of an inlet of the transport pipe, and the exhaust port of the vacuum pump is connected to the port for supplying gas.

5. An apparatus for transporting powdered or granular materials by pneumatic force with a transport pipe of smaller diameter relative to particle size, as defined in claim 2 or 3, wherein as a powdered or granular materials floating means, feeder having inlet communicating with a material outlet of a storage vessel, outlet communicating with the transport pipe, and material transporting passages is formed, and a 1st gas conducting hole and a 2nd gas conducting hole are formed to communicate with an upper-stream side and a lower-stream side respectively of the material transporting passage such that compressed gas for transporting the materials is supplied from the 1st gas conducting hole, whereas air for a compressor which transports the powdered or granular materials becoming residual in the pipe upon completion of transporting the material is supplied from the 2nd gas conducting hole.

6. An apparatus for transporting powdered or granular materials by pneumatic force with transport pipe of smaller diameter relative to particle size, as defined in claim 5 wherein inlets of feeder takes elliptical cross sections.

7. An apparatus for transporting powdered or granular materials by pneumatic force with transport pipe of smaller diameter relative to particle size, as defined in claim 3 or 3, wherein as a powdered or granular floating means, not only an arrangement of inserting a lower end side of the transport pipe into a storage vessel is made, but also feeder for transporting the powdered or granular materials in the storage vessel to an upper end side of the transport pipe by the pneumatic force is used, a lower side of material inlet, communicating with a transport passage of the transport pipe, which is formed at a side wall of a joint being connected to a lower part of the transport pipe or to a lower end part of the transport pipe as a unit partially united with transport pipe, is equipped with a nozzle being connected to a pneumatic power source, and an exhaust hole of the nozzle is opposed to the transport pipe such that it communicates with an inside of the transport pipe.

8. An apparatus for transporting powdered or granular materials by pneumatic force with a transport pipe of smaller diameter relative to particle size as defined in claim 7, wherein a nozzle is provided movably with respect to a material inlet.

9. An apparatus for transporting powdered or granular material by pneumatic force with a transport pipe of smaller diameter relative to particle size, as defined in claim 2 or 3, wherein as powdered or granular materials floating means, a rotary plate is provided in vicinity of an inlet of the transport pipe running in line with a material outlet of a storage vessel, and one or a plurality of openings which communicate with the inlet of the transport pipe are formed in the rotary plate.

10. An apparatus for transporting powdered or granular materials by pneumatic force with a transport pipe of smaller diameter relative to particle size, as defined in claim 2 or 3, wherein a powdered or granular floating means comprises a reciprocating movable article which moves vertically in a housing for reciprocating movable article formed between a material outlet of a storage vessel and an inlet of the transport pipe communicating with the material outlet, and a cylinder, operable by fluid pressure, which drives vertically the reciprocating movable article.

11. An apparatus for transporting powdered or granular materials by pneumatic force with a transport pipe of smaller diameter relative to particle size, as defined in claim 2 or 3, wherein as a powdered or granular floating means, a material housing chamber of feeder being connected to a storage vessel is formed at a position eccentric from a material conducting passage, a material outlet being connected to the transport pipe is formed at the location where the material housing chamber is provided, a nozzle being connected to a pneumatic powder source is provided at a position opposite to the material outlet, and an angle of repose restricting member, such as a rotor and the like, which causes a surface part of the materials to be transport, which are to make the angle of repose to be located within the scope of an opening sectional area of the material outlet is provided in vicinity of the material housing chamber.

12. An apparatus for transporting powdered or granular materials by pneumatic force with a transport pipe of smaller diameter relative to particle size, as defined in claim 11, wherein an angle of repose restricting member is a rotor whose outer periphery has one or a plurality of material housing recessed past formed thereon.

13. An apparatus for transporting powdered or granular materials by pneumatic force with a transport pipe of smaller diameter relative to particle size, as defined in claim 11, wherein an angle of repose restricting member is a partition plate capable of being adjusted its admission depth into a material housing chamber or a material conducting passage.

14. An apparatus for transporting powdered or granular materials by pneumatic force with a transport pipe of smaller diameter relative to particle size, as defined in claim 11, wherein a nozzle is detachably mounted to a feeder.

15. An apparatus for transporting powdered or granular materials by pneumatic force with a transport pipe of smaller diameter relative to particle size, as defined in claim 2 or 3, wherein a powdered or granular materials floating means comprises a material housing chamber, formed into a thin-layer-shaped space, which is filled with the powdered or granular materials in a thin-layer-shaped manner, a feeder proper being connected to a storage vessel, the transport pipe being connected to communicate with one side of a material outlet of the material housing chamber, and a nozzle, opposite to the transport pipe, which is connected to communicate with another side of the material outlet of the material housing chamber.

16. An apparatus for transporting powdered or granular materials by pneumatic force with a transport pipe of smaller diameter relative to particle size, as defined in claim 15, wherein a feeder proper has an inlet of a material housing chamber inclined with respect to an outlet thereof.

17. An apparatus for transporting powdered or granular materials by pneumatic force with a transport pipe of smaller diameter relative to particle size, as defined in claim 15, wherein a controlling member capable of regulating a flow of the material is provided in the vicinity of a material outlet of a material housing chamber of a feeder proper.

18. An apparatus for transporting powdered or granular materials by pneumatic force with a transport pipe of smaller diameter relative to particle size comprising:
a storage vessel;
a transport pipe of smaller diameter, having a bore 2–6 times as long as maximum length of particle of the powdered or granular materials to be transported, which communicates with a material outlet of the storage vessel;
a pneumatic power source for transporting the powdered or granular materials in the storage vessel by way of the transport pipe to a destination;
a powdered or granular floating means of transporting the powdered or granular materials by the pneumatic power from the inside of the transport pipe to a destination in such a manner that the powdered or granular materials do not lodge in the transport pipe, while the powdered or granular materials are caused to be kept to float at an inlet or in the vicinity of the inlet of transport pipe; and a collector, provided at an outlet of the transport pipe, which collects the powdered or granular materials and transporting gas in a separate manner.

19. An apparatus for transporting powdered or granular materials by pneumatic power with a transport pipe of smaller diameter relative to particle size, as defined in claim 18, wherein a collector has at least partial part of its wall on a housing chamber side equipped with an electrode, the electrode opposite to the former electrode is provided in the housing chamber in the wall on the housing chamber side, or one unit or a plurality of units of electrodes, differently opposite to each other, are formed to be overlaid upon each other on the wall on the housing chamber side with an insulated part interposed between them, the two pairs of electrodes are connected to a detecting part, and a change in electrostatic capacity between the two pairs of electrodes, caused by filling the housing chamber with the powdered or granular materials, is detected by the detecting part, whereby a level of the powdered or granular materials in the housing chamber of the collector can be detected.

20. An apparatus for transporting powdered or granular materials by pneumatic force with a transport pipe of smaller diameter relative to particle size, as defined in claim 18, wherein a collector comprises a collector proper which collects the powdered or granular materials and a separator which separates the powdered or granular materials and transporting gas from each other, the separator is disposed on the upper-stream side with respect to the collector proper, the transport pipe having a passage for the powdered or granular materials is inserted into the separator, a gas conducting passage which takes out the transporting gas and dust is provided in the transport pipe, and an exhaust hold which discharges the separated gas and dust to the outside of the separator is formed on the outer wall of the separator.

21. An apparatus for transporting powdered or granular materials by pneumatic force with a transport pipe of smaller diameter relative to particle size, as defined in claim 20, wherein an outer wall of a separator is formed out of permeable material through which transporting gas and dust can pass.

22. An apparatus for transporting powdered or granular materials by pneumatic force with a transport pipe of smaller diameter relative to particle size, as defined in claim 20 or 21, wherein inner opposite diameters of a passage for the powdered or granular materials in the transport pipe which is inserted into a separator, one on the lower-stream side is preferably identical or slightly larger than another on the upper-stream.

23. An apparatus for transporting powdered or granular materials by pneumatic force with a transport pipe of smaller diameter relative to particle size, as defined in claim 20 or 21, wherein a gas conducting passage is constituted by a slit which is formed between a lower end margin of the transport pipe which is inserted into a separator and an upper opening margin of a material outlet of the separator, and the slit has its flow sectional area fluctuated in response to a vertical movement of the transport pipe.

24. An apparatus for transporting powdered or granular materials by pneumatic force with a transport pipe of smaller diameter relative to particle size, as defined in claim 18, wherein a collector comprises the collector proper for collecting the powdered or granular materials and a separator for separating the powdered or granular materials and transporting gas from each other, the separator is disposed on an upper-stream side with respect to the collector, the transport pipe having a passage for the powdered or granular materials is inserted into the separator, a gas conducting passage for taking out the transporting gas and dust is provided in the transport pipe, and a part for mounting an exhaust hole is formed in an outer wall of the separator, while a gas supply pipe for supplying the gas so that the gas conducting passage may be cleaned is connected to an exhaust pipe, having the exhaust hole, which is connected to the past for mounting the exhaust hole of the separator.

25. An apparatus for transporting powdered or granular materials by pneumatic force with a transport pipe of smaller diameter relative to particle size, as defined in claim 24, wherein a gas supply pipe for supplying gas so that the inside of a collector proper may be cleaned is provided in the collector proper, and the gas which is supplied from the gas supply pipe is discharged from a separator or an exhaust hole provided in the collector proper.

26. An apparatus for transporting powdered or granular materials by pneumatic force with a transport pipe of smaller diameter relative to particle size, as defined in claim 12, wherein a nozzle is detachably mounted to a feeder.

27. An apparatus for transporting powdered or granular materials by pneumatic force with a transport pipe of smaller diameter relative to particle size, as defined in claim 16, wherein a controlling member capable of regulating a flow of the material is provided in the vicinity of a material outlet of a material housing chamber of a feeder proper.

28. An apparatus for transporting powdered or granular materials by pneumatic force with a transport pipe of smaller diameter relative to particle size, as defined in claim 22, wherein a gas conducting passage is constituted by a slit which is formed between a lower end margin of the transport pipe which is inserted into a separator and an upper opening margin of a material outlet of the separator, and the slit has its flow sectional area fluctuated in response to a vertical movement of the transport pipe.

29. An apparatus for transporting powdered or granular materials by pneumatic force with a transport pipe of smaller diameter relative to particle size, as defined in claim 13, wherein a nozzle is detachably mounted to a feeder.

* * * * *